US012611858B2

(12) United States Patent
Shinkawa

(10) Patent No.: US 12,611,858 B2
(45) Date of Patent: Apr. 28, 2026

(54) LIQUID EJECTING APPARATUS AND PRINT HEAD

(71) Applicant: SEIKO EPSON CORPORATION, Tokyo (JP)

(72) Inventor: Osamu Shinkawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 237 days.

(21) Appl. No.: 18/539,358

(22) Filed: Dec. 14, 2023

(65) Prior Publication Data

US 2024/0198662 A1 Jun. 20, 2024

(30) Foreign Application Priority Data

Dec. 16, 2022 (JP) ................................ 2022-201011

(51) Int. Cl.
*B41J 2/045* (2006.01)
*B41J 2/14* (2006.01)

(52) U.S. Cl.
CPC ......... *B41J 2/04551* (2013.01); *B41J 2/0451* (2013.01); *B41J 2/04573* (2013.01); *B41J 2/04581* (2013.01); *B41J 2/04593* (2013.01); *B41J 2002/14354* (2013.01)

(58) Field of Classification Search
CPC .. B41J 2/04551; B41J 2/0451; B41J 2/04573; B41J 2/04581; B41J 2/04593; B41J 2002/14354; B41J 2/04541; B41J 2/04596; B41J 2/04588
See application file for complete search history.

(56) References Cited

U.S. PATENT DOCUMENTS

2010/0060690 A1* 3/2010 Hosokawa ............. B41J 2/0451 347/14
2020/0094547 A1 3/2020 Saito et al.

FOREIGN PATENT DOCUMENTS

JP 2020-044771 A 3/2020

* cited by examiner

*Primary Examiner* — Justin Seo
(74) *Attorney, Agent, or Firm* — Spencer Fane LLP

(57) ABSTRACT

A liquid ejecting apparatus including: an ejection section including a piezoelectric element that is driven by a drive signal in a unit period, a pressure chamber having a volume changed according to driving of the piezoelectric element, and a nozzle ejecting the liquid in the pressure chamber; a detection section detecting a potential the piezoelectric element; and a determination section determining an ejection state of the ejection section according to a detection result of the detection section using a determination mode selected from among a plurality of determination modes, in which when the piezoelectric element is driven in another unit period preceding one unit period, the determination section determines the ejection state of the ejection section using the first determination mode, and when the piezoelectric element is not driven in the other unit period, the determination section determines the ejection state of the ejection section using the second determination mode.

10 Claims, 17 Drawing Sheets

FIG. 7

| Sd[m] | D[m] | Qc[m] | | Qs[m] | |
|---|---|---|---|---|---|
| | | TQ1 | TQ2 | TQ1 | TQ2 |
| 1 | DP-1 | H | L | L | L |
| 2 | DP-2 | L | H | L | L |
| 3 | DP-3 | L | L | L | L |

FIG. 8

| Sd[m] | D[m] | Qc[m] | | | | | Qs[m] | | | | |
|---|---|---|---|---|---|---|---|---|---|---|---|
| | | TS1 | TS2 | TS3 | TS4 | TS5 | TS1 | TS2 | TS3 | TS4 | TS5 |
| 4 | DH−1 | H | L | L | L | L | L | H | L | L | L |
| 5 | DH−2 | L | L | H | L | L | L | L | L | H | L |

FIG. 10

| SG[m] | CURRENT CORRESPONDENCE DETERMINATION MODE BG |
|---|---|
| α=4 | BG1: LARGE DOT DETERMINATION MODE |
| α=5 | BG2: SMALL DOT DETERMINATION MODE |

FIG. 11

| ST[m] | PAST CORRESPONDENCE DETERMINATION MODE BT |
|---|---|
| β=1 | BT1: LARGE DOT DETERMINATION MODE |
| β=2 | BT2: SMALL DOT DETERMINATION MODE |
| β=3 | BT3: NON-DRIVE DETERMINATION MODE |

FIG. 12

| SR[m] | Sd[m+1] | Sd[m−1] | ADJACENT CORRESPONDENCE DETERMINATION MODE BR |
|---|---|---|---|
| $\gamma=1$ | 1: LARGE DOT | 1: LARGE DOT | **BR1**: LARGE DOT DETERMINATION MODE |
| $\gamma=2$ | 1: LARGE DOT | 2: SMALL DOT | **BR2**: LARGE DOT DETERMINATION MODE |
| | 2: SMALL DOT | 1: LARGE DOT | |
| $\gamma=3$ | 1: LARGE DOT | 3: NON-DRIVE | **BR3**: LARGE DOT DETERMINATION MODE |
| | 3: NON-DRIVE | 1: LARGE DOT | |
| $\gamma=4$ | 2: SMALL DOT | 2: SMALL DOT | **BR4**: SMALL DOT DETERMINATION MODE |
| $\gamma=5$ | 2: SMALL DOT | 3: NON-DRIVE | **BR5**: SMALL DOT DETERMINATION MODE |
| | 3: NON-DRIVE | 2: SMALL DOT | |
| $\gamma=6$ | 3: NON-DRIVE | 3: NON-DRIVE | **BR6**: NON-DRIVE DETERMINATION MODE |

LIQUID EJECTING APPARATUS AND PRINT HEAD

The present application is based on, and claims priority from JP Application Serial Number 2022-201011, filed Dec. 16, 2022, the disclosure of which is hereby incorporated by reference herein in its entirety.

BACKGROUND

1. Technical Field

The present disclosure relates to a liquid ejecting apparatus and a print head.

2. Related Art

A liquid ejecting apparatus such as an ink jet printer drives a piezoelectric element provided in the ejection section of a print head to eject, from a nozzle, a liquid such as ink filling a pressure chamber provided in an ejection section and form an image on a medium. However, in the liquid ejecting apparatus, an ejection abnormality in which the liquid cannot be normally ejected from the ejection section may occur. Therefore, in the related art, a technique for determining an ejection state of the ejection section is being proposed. For example, JP-A-2020-044771 discloses a technique for determining an ejection state of an ejection section based on a detection result of a potential of a piezoelectric element provided in the ejection section.

However, in the recent liquid ejecting apparatus, an interval at which the ejection section is driven becomes shorter as a printing speed increases. Therefore, in a period before the determination of the ejection state of the ejection section, the presence/absence of driving of the ejection section affects the ejection state of the ejection section, so that the determination cannot be accurately performed.

SUMMARY

According to an aspect of the present disclosure, there is provided a liquid ejecting apparatus including: an ejection section including a piezoelectric element that is driven by a drive signal in a unit period defined by a timing signal, a pressure chamber filled with a liquid and having a volume changed according to driving of the piezoelectric element, and a nozzle ejecting the liquid in the pressure chamber according to the change in volume of the pressure chamber; a detection section detecting a potential of the piezoelectric element; and a determination section determining an ejection state of the ejection section according to a detection result of the detection section using a determination mode selected from among a plurality of determination modes including a first determination mode and a second determination mode, in which when the piezoelectric element is driven by the drive signal in another unit period preceding one unit period, the determination section determines the ejection state of the ejection section using the first determination mode according to a detection result of the detection section in the one unit period, and when the piezoelectric element is not driven by the drive signal in the other unit period, the determination section determines the ejection state of the ejection section using the second determination mode according to the detection result of the detection section in the one unit period.

Further, according to another aspect of the present disclosure, there is provided a print head including: an ejection section including a piezoelectric element that is driven by a drive signal in a unit period defined by a timing signal, a pressure chamber filled with a liquid and having a volume changed according to driving of the piezoelectric element, and a nozzle ejecting the liquid in the pressure chamber according to the change in volume of the pressure chamber; a detection section detecting a potential of the piezoelectric element; and a determination section determining an ejection state of the ejection section according to a detection result of the detection section using a determination mode selected from among a plurality of determination modes including a first determination mode and a second determination mode, in which when the piezoelectric element is driven by the drive signal in another unit period preceding one unit period, the determination section determines the ejection state of the ejection section using the first determination mode according to a detection result of the detection section in the one unit period, and when the piezoelectric element is not driven by the drive signal in the other unit period, the determination section determines the ejection state of the ejection section using the second determination mode according to the detection result of the detection section in the one unit period.

BRIEF DESCRIPTION OF THE DRAWINGS

FIG. 7 is an explanatory diagram for explaining an example of an individual designation signal.

FIG. 8 is an explanatory diagram for explaining an example of an individual designation signal.

FIG. 10 is an explanatory diagram for explaining an example of a current ejection designation signal.

FIG. 11 is an explanatory diagram for explaining an example of a past ejection designation signal.

FIG. 12 is an explanatory diagram for explaining an example of an adjacent ejection designation signal.

DESCRIPTION OF EMBODIMENTS

Hereinafter, embodiments for carrying out the present disclosure will be described with reference to the drawings. However, a dimension and a scale of each part are different from actual ones as appropriate in each drawing. The embodiments described below are preferred specific examples of the present disclosure and are thus added with technically preferred various limitations, but the scope of the present disclosure is not limited to such embodiments unless description for limiting the present disclosure is made in the following description.

A. Embodiment

In the present embodiment, a liquid ejecting apparatus will be described by exemplifying an ink jet printer that forms an image on recording paper PP by ejecting ink.

1. Overview of Ink Jet Printer

Hereinafter, an example of a configuration of an ink jet printer 1 according to the present embodiment will be described with reference to FIGS. 1 to 4.

Figure 1:
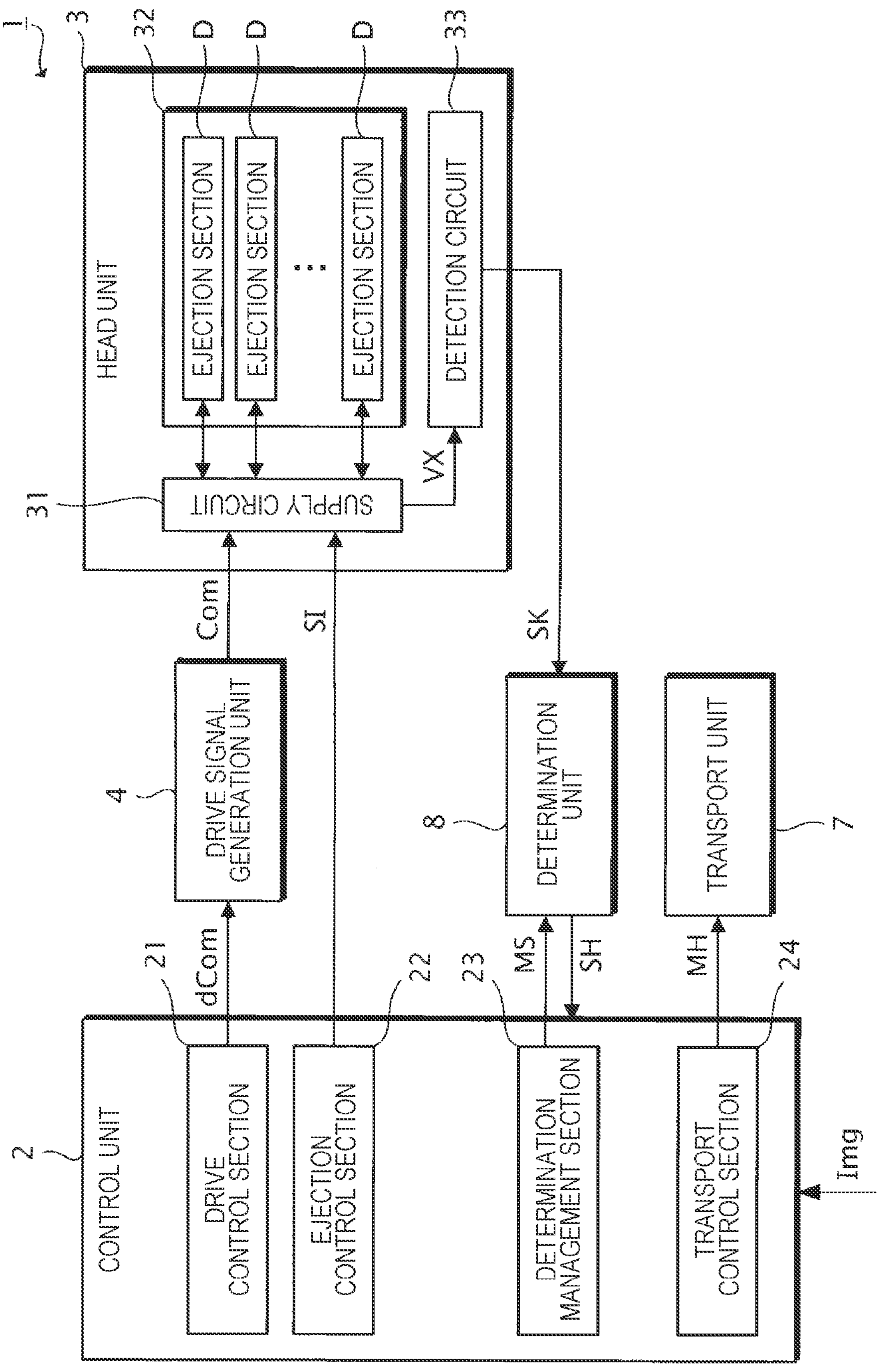
FIG. 1 is a block diagram illustrating an example of a configuration of an ink jet printer according to an embodiment of the present disclosure.

FIG. 1 is a functional block diagram showing an example of a configuration of the ink jet printer 1.

As illustrated in FIG. 1, the ink jet printer 1 is supplied with print data Img indicating an image to be formed by the ink jet printer 1 from a host computer such as a personal computer or a digital camera. The ink jet printer 1 executes a printing process of forming the image, which is indicated by the print data Img supplied from the host computer, on the recording paper PP.

As illustrated in FIG. 1, the ink jet printer 1 includes a control unit 2 that controls each part of the ink jet printer 1, a head unit 3 provided with an ejection section D that ejects ink, a drive signal generation unit 4 that generates a drive signal Com for driving the ejection section D, a transport unit 7 for changing a relative position of the recording paper PP with respect to the head unit 3, and a determination unit 8 that determines an ejection state of the ink of the ejection section D.

In the present embodiment, the ink jet printer 1 is an example of a "liquid ejecting apparatus", the ink is an example of a "liquid", and the determination unit 8 is an example of a "determination section".

In the present embodiment, it is assumed that the ink jet printer 1 includes one or more head units 3, one or more drive signal generation units 4 corresponding to the one or more head units 3 on a one-to-one basis, and one or more determination units 8 corresponding to the one or more head units 3 on a one-to-one basis. Specifically, in the present embodiment, it is assumed that the ink jet printer 1 includes four head units 3, four drive signal generation units 4 corresponding to the four head units 3 on a one-to-one basis, and four determination units 8 corresponding to the four head units 3 on a one-to-one basis. However, in the following, for convenience of description, as illustrated in FIG. 1, a description will be given by focusing on one head unit 3 among the four head units 3, one drive signal generation unit 4 among the four drive signal generation units 4, which corresponds to the one head unit 3, and one determination unit 8 among the four determination units 8, which corresponds to the one head unit 3.

The control unit 2 includes one or more CPUs. However, the control unit 2 may have a programmable logic device such as FPGA instead of or in addition to the CPU. In this case, the CPU is an abbreviation for central processing unit, and the FPGA is an abbreviation for field-programmable gate array. In addition, the control unit 2 includes a memory. The memory includes one or both of a volatile memory such as RAM, that is, a random access memory, and a non-volatile memory such as ROM, that is, a read only memory, EEPROM, that is, an electrically erasable programmable read-only memory, or PROM, that is, a programmable ROM.

The control unit 2 executes a control program stored in the memory and is driven according to the control program to function as a drive control section 21, an ejection control section 22, a determination management section 23, and a transport control section 24.

The drive control section 21 generates a waveform designation signal dCom. The waveform designation signal dCom is a digital signal that defines a waveform of a drive signal Com. The drive signal Com is an analog signal for driving the ejection section D. The drive signal generation unit 4 includes a DA converter circuit and generates the drive signal Com having the waveform defined by the waveform designation signal dCom.

The ejection control section 22 generates a designation signal SI. The designation signal SI is a digital signal that designates a type of operation of the ejection section D. Specifically, the designation signal SI is a signal that designates a type of operation of the ejection section D by designating whether or not it is driven by supplying the drive signal Com to the ejection section D.

The transport control section 24 generates a transport control signal MH for controlling the transport unit 7.

As illustrated in FIG. 1, the head unit 3 includes a supply circuit 31, a recording head 32, and a detection circuit 33.

The recording head 32 includes M ejection sections D. In this case, a value M is a natural number that satisfies "M≥2". Hereinafter, among the M ejection sections D provided in the recording head 32, the m-th ejection section D may be referred to as an ejection section D[m]. In this case, a variable m is a natural number that satisfies "1≤m≤M". In addition, in the following, when a component, signal, or the like of the ink jet printer 1 corresponds to the ejection section D[m] among the M ejection sections D, a subscript [m] may be added to a code for representing the component, signal, or the like.

The supply circuit 31 switches whether to supply the drive signal Com to the ejection section D[m] based on the designation signal SI. In the following, among the drive signals Com, the drive signal Com supplied to the ejection section D[m] may be referred to as a supply drive signal Vin[m].

The supply circuit 31 switches whether to supply a detection potential signal VX[m] indicating a potential of an upper electrode Zu[m] of a piezoelectric element PZ[m] of the ejection section D[m] to the detection circuit 33, based on the designation signal SI. In the following, when the detection potential signal VX[m] is supplied from the ejection section D[m] to the detection circuit 33, the ejection section D[m] may be referred to as a determination target ejection section DH. The piezoelectric element PZ[m] and the upper electrode Zu[m] will be described later in FIG. 3.

The detection circuit 33 generates a detection signal SK[m] based on the detection potential signal VX[m] supplied from the ejection section D[m], which is set as the determination target ejection section DH, via the supply circuit 31. Specifically, the detection circuit 33 generates the detection signal SK[m] by, for example, amplifying the detection potential signal VX[m] and removing a noise component. In the present embodiment, the detection circuit 33 is an example of a "detection section".

The determination unit 8 determines whether or not an ink ejection state of the ejection section D[m] is normal based on the detection signal SK[m]. In other words, the determination unit 8 determines whether or not an ejection abnormality of the ejection section D[m] occurs based on the detection signal SK[m]. Then, the determination unit 8 generates determination information SH[m] indicating a result of the determination. In this case, the ejection abnormality is a general term for a state in which the ink cannot be normally ejected from a nozzle N of the ejection section D[m]. For example, the ejection abnormality includes a state in which the ink cannot be ejected from the ejection section D[m], a state in which the ejection section D[m] ejects an amount of ink different from an ink ejection amount defined by the drive signal Com, a state in which the ejection section D[m] ejects the ink at a speed different from an ink ejection speed defined by the drive signal Com, or the like.

In the following, a process of determining the ejection state of the ejection section D[m] based on the detection signal SK[m] is referred to as an ejection state determination process. In the present embodiment, the determination unit 8 executes the ejection state determination process by a determination mode selected from a plurality of determination modes.

The determination management section 23 generates a mode designation signal MS that designates a determination mode to be executed by the determination unit 8, based on the designation signal SI. The determination unit 8 executes the ejection state determination process according to the determination mode designated by the mode designation signal MS supplied from the determination management section 23.

In the following, a process of detecting the detection potential signal VX[m] from the ejection section D[m] by driving the ejection section D[m] as the determination target ejection section DH to generate the detection signal SK[m] based on the detected detection potential signal VX[m] is referred to as a determination target drive process.

When the determination target drive process is executed, the ejection control section 22 generates a signal for controlling the head unit 3 such as the designation signal SI. In addition, the drive control section 21 generates a signal for controlling the drive signal generation unit 4, such as the waveform designation signal dCom, when the determination target drive process is executed. As a result, the control unit 2 drives the ejection section D[m] as the determination target ejection section DH in the determination target drive process. In addition, the detection circuit 33 generates the detection signal SK[m] based on the detection potential signal VX[m] detected from the ejection section D[m], which is driven as the determination target ejection section DH, in the determination target drive process.

Further, as described above, the ink jet printer 1 executes a printing process. When the printing process is executed, the ejection control section 22 generates a signal for controlling the head unit 3 such as the designation signal SI based on the print data Img. In addition, the drive control section 21 generates a signal for controlling the drive signal generation unit 4, such as the waveform designation signal dCom, when the printing process is executed. In addition, the transport control section 24 generates the transport control signal MH for controlling the transport unit 7 when the printing process is executed. As a result, the control unit 2 controls the transport unit 7 to change the relative position of the recording paper PP with respect to the head unit 3 in the printing process, adjusts the presence/absence of ink ejection from the ejection section D[m], the ejection amount of ink, the ejection timing of ink, and the like, and controls each section of the ink jet printer 1 to form an image corresponding to the print data Img on the recording paper PP.

Hereinafter, the printing process and the determination target drive process may be collectively referred to as an ejection section drive process.

Figure 2:
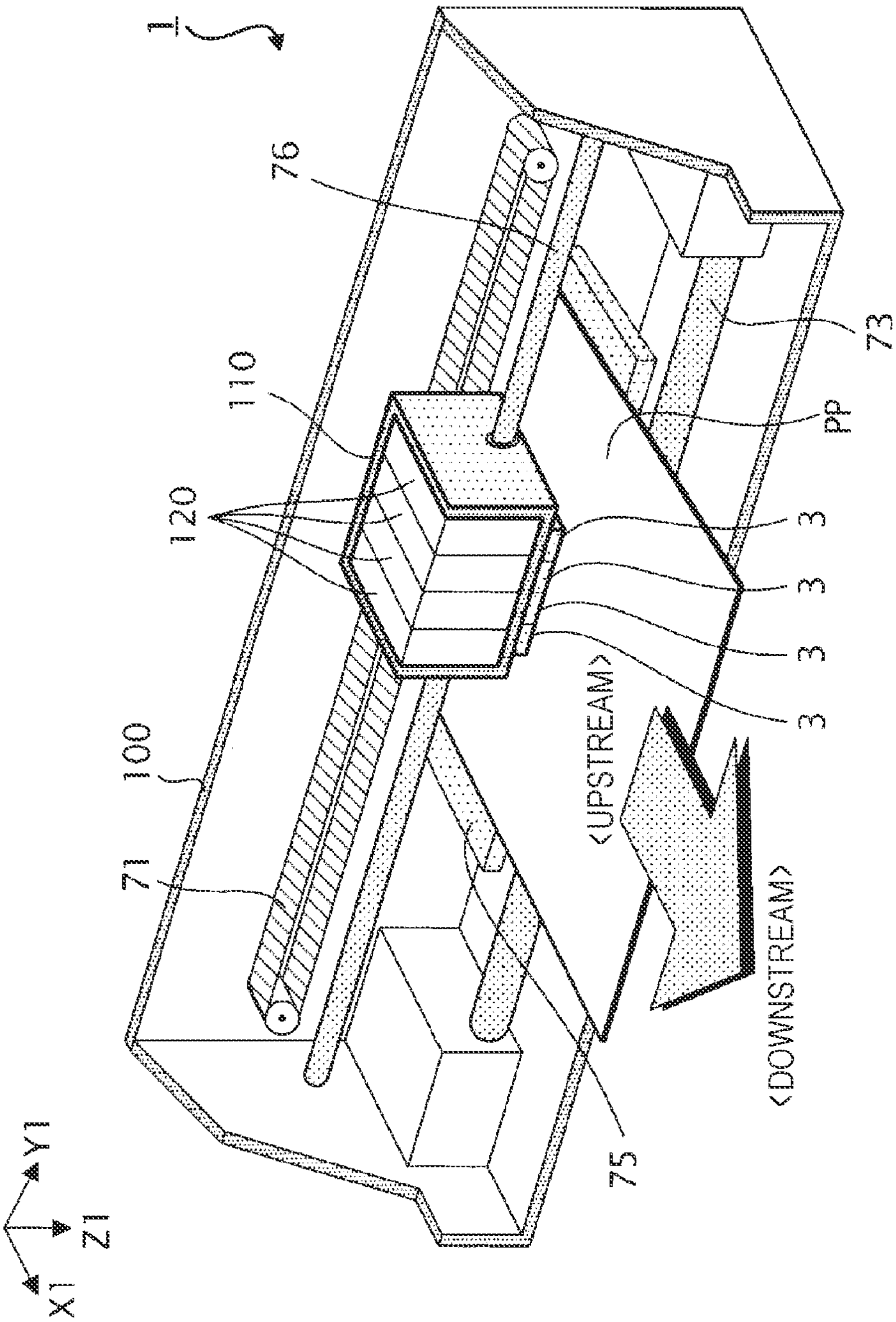
FIG. 2 is a perspective view illustrating an example of a schematic structure of the ink jet printer.

FIG. 2 is a perspective view illustrating an example of a schematic internal structure of the ink jet printer 1.

As illustrated in FIG. 2, in the present embodiment, it is assumed that the ink jet printer 1 is a serial printer. Specifically, when executing the printing process, the ink jet printer 1 ejects the ink from the ejection section D[m] while transporting the recording paper PP in an X1 direction and reciprocating the head unit 3 in a Y1 direction intersecting the X1 direction and a Y2 direction opposite to the Y1 direction, thereby forming dots Dt corresponding to the print data Img on the recording paper PP.

In the following, an X2 direction opposite to the X1 direction is collectively referred to as an "X-axis direction", the Y2 direction opposite to the Y1 direction that intersects the X-axis direction is collectively referred to as a "Y-axis direction", and a Z2 direction opposite to a Z1 direction that intersects the X-axis direction and the Y-axis direction is collectively referred to as a "Z-axis direction". In the present embodiment, as an example, description will be made by assuming that the X-axis direction, the Y-axis direction, and the Z-axis direction are orthogonal to each other. However, the present disclosure is not limited to such an aspect. The X-axis direction, the Y-axis direction, and the Z-axis direction may intersect each other. In the present embodiment, the Z1 direction is a direction in which the ink is ejected from the ejection section D[m].

As illustrated in FIG. 2, the ink jet printer 1 according to the present embodiment includes a housing 100 and a carriage 110 capable of reciprocating in the Y-axis direction in the housing 100 and having four head units 3 mounted thereon.

In the present embodiment, as illustrated in FIG. 2, it is assumed that the carriage 110 stores four ink cartridges 120 corresponding to four color inks of cyan, magenta, yellow, and black in a one-to-one basis. Further, in the present embodiment, as described above, it is assumed that the ink jet printer 1 includes four head units 3 corresponding to the four ink cartridges 120 on a one-to-one basis. Each ejection section D[m] receives the ink supplied from the ink cartridge 120 corresponding to the head unit 3 provided with the ejection section D[m]. Accordingly, each ejection section D[m] can fill the inside with the supplied ink, and the filled ink can be ejected from the nozzle N provided in the ejection section D. The ink cartridge 120 may be provided outside the carriage 110.

Further, as described above, the ink jet printer 1 according to the present embodiment includes the transport unit 7. The transport unit 7 includes a carriage transport mechanism 71 for reciprocating the carriage 110 in the Y-axis direction, a carriage guide shaft 76 for supporting the carriage 110 to reciprocate in the Y-axis direction, a medium transport mechanism 73 for transporting the recording paper PP, and a platen 75 provided in the Z1 direction of the carriage 110.

Therefore, when executing the printing process, the transport unit 7 reciprocates the head unit 3 in the Y-axis direction along the carriage guide shaft 76 together with the carriage 110 by the carriage transport mechanism 71, so as to transport the recording paper PP on the platen 75 in the X1 direction by the medium transport mechanism 73, so that the relative position with respect to the head unit 3 of the recording paper PP is changed, and the ink can land on the entire recording paper PP.

Figure 3:
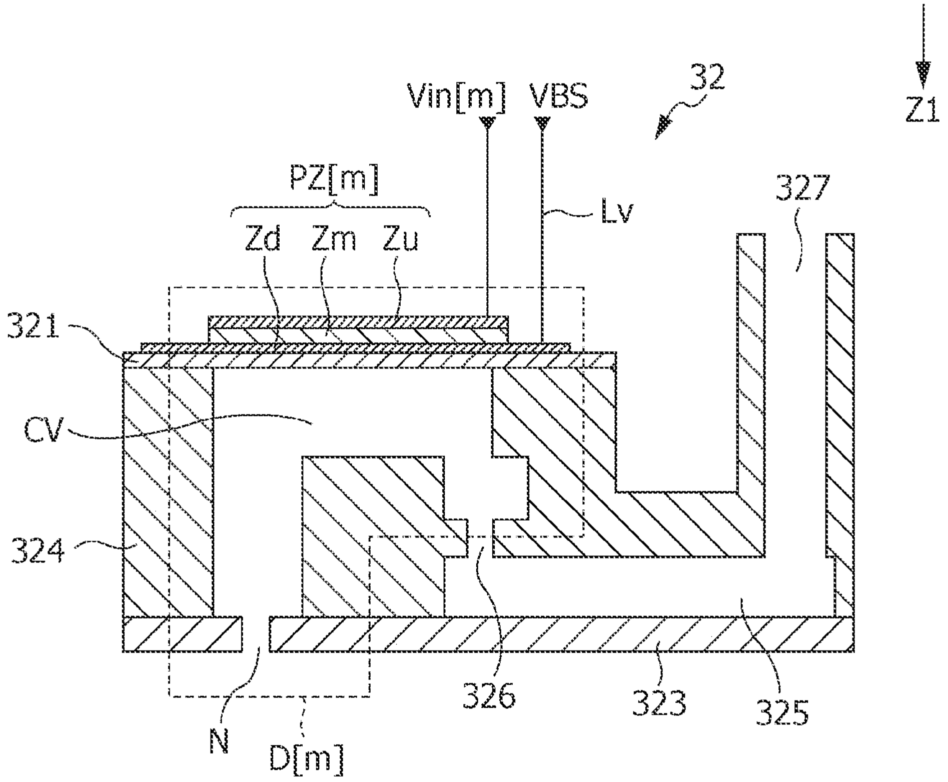
FIG. 3 is a sectional view for explaining an example of a structure of an ejection section.

FIG. 3 is a schematic partial sectional view of the recording head 32 in which the recording head 32 is cut so as to include the ejection section D[m].

As illustrated in FIG. 3, the ejection section D[m] includes the piezoelectric element PZ[m], a cavity CV filled with the ink, a nozzle N[m] that communicates with the cavity CV, and a vibrating plate 321. The ejection section D[m] ejects the ink into the cavity CV from the nozzle N by driving the piezoelectric element PZ[m] by the supply drive signal Vin[m]. The cavity CV[m] is a space partitioned by a cavity plate 324, a nozzle plate 323 in which the nozzles N[m] are formed, and the vibrating plate 321. The cavity CV[m] communicates with a reservoir 325 via an ink supply port 326. The reservoir 325 communicates with the ink cartridge 120 corresponding to the ejection section D[m] via an ink intake port 327. The piezoelectric element PZ[m] includes an upper electrode Zu[m], a lower electrode Zd[m], and a piezoelectric body Zm[m] provided between the upper electrode Zu[m] and the lower electrode Zd[m]. The lower electrode Zd[m] is electrically coupled to a power supply line Lv set to a predetermined potential VBS. When the supply drive signal Vin[m] is supplied to the upper electrode Zu[m] and a voltage is applied between the upper electrode Zu[m] and the lower electrode Zd[m], the piezoelectric element PZ[m] is displaced in the Z1 direction or the Z2 direction in accordance with the applied voltage, and as a result, the piezoelectric element PZ[m] vibrates. The lower electrode Zd[m] is joined to the vibrating plate 321. Therefore, when the piezoelectric element PZ[m] is driven by the supply drive signal Vin[m] and vibrates, the vibrating plate 321 also vibrates. The vibration of the vibrating plate 321 changes the volume of the cavity CV[m] and the pressure in the cavity CV[m], and the ink that fills the cavity CV[m] is ejected from the nozzle N[m].

In the present embodiment, the cavity CV[m] is an example of a "pressure chamber", and the reservoir 325 is an example of a "common liquid chamber".

Figure 4:
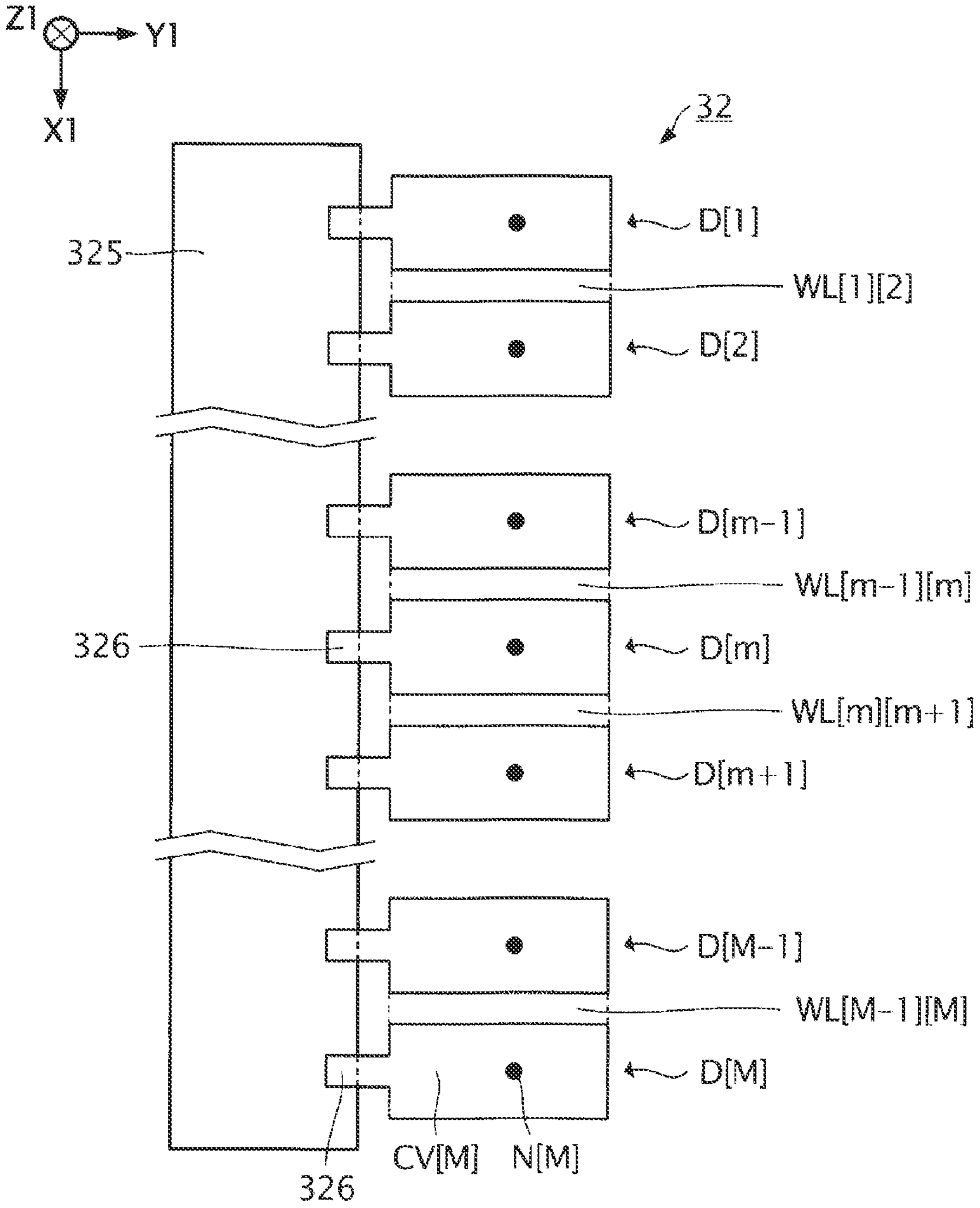
FIG. 4 is an explanatory diagram illustrating an example of a schematic structure of a recording head.

FIG. 4 is an explanatory diagram illustrating an example of a schematic configuration of M ejection sections D[1] to D[M] provided in the recording head 32 and the reservoir 325 provided in the recording head 32.

As illustrated in FIG. 4, in the present embodiment, the recording head 32 has M cavities CV[1] to CV[M] corresponding to the M ejection sections D[1] to D[M]. In FIG. 4, for convenience of description, a variable m will be described as a natural number that satisfies "1<m<M".

In the present embodiment, it is assumed that the cavity CV[m] and the cavity CV[m+1] are adjacent to each other via a partition wall WL[m][m+1]. In addition, in the present embodiment, it is assumed that the cavity CV[m−1] and the cavity CV[m] are adjacent to each other via a partition wall WL[m−1] [m].

Therefore, in the present embodiment, when the ejection section D[m] is driven by the drive signal Com, the vibration accompanying the driving propagates to the ejection section D[m+1] via the partition wall WL[m][m+1] or the vibration accompanying the driving also propagates to the ejection section D[m−1] via the partition wall WL[m−1] [m].

In the present embodiment, the cavity CV[m] communicates with the reservoir 325 via the ink supply port 326 corresponding to the cavity CV[m]. That is, in the present embodiment, the reservoir 325 supplies the ink to the M cavities CV[1] to CV[M]. Therefore, when the ejection section D[m] is driven by the drive signal Com, the vibration accompanying the driving are propagated to the plurality of ejection sections D including the ejection section [m+1] and the ejection section D[m−1] via the reservoir 325.

2. Overview of Head Unit

Hereinafter, an overview of the head unit 3 will be described with reference to FIGS. 5 to 8.

Figure 5:
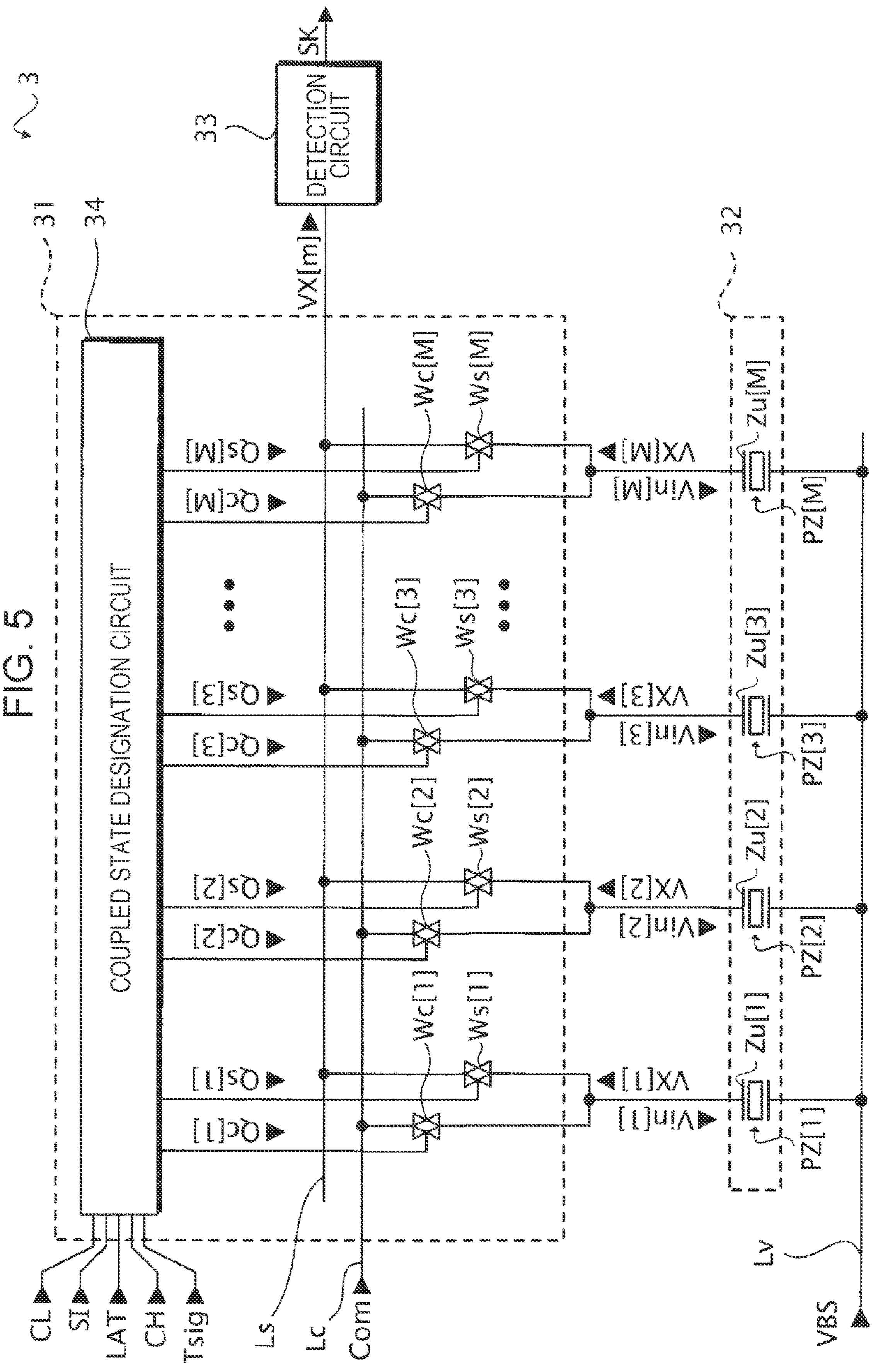
FIG. 5 is a block diagram illustrating an example of a configuration of a head unit.

FIG. 5 is a block diagram illustrating an example of a configuration of the head unit 3.

As illustrated in FIG. 5, the head unit 3 includes the supply circuit 31, the recording head 32, and the detection circuit 33. In addition, the head unit 3 includes a wiring Lc for supplying the drive signal Com from the drive signal generation unit 4 and a wiring Ls for supplying the detection potential signal VX[m] to the detection circuit 33.

The supply circuit 31 includes M switches Wc[1] to Wc[M] corresponding to the M ejection sections D[1] to D[M] on a one-to-one basis, M switches Ws[1] to Ws[M] corresponding to the M ejection sections D[1] to D[M] on a one-to-one basis, and a coupled state designation circuit 34 for designating the coupled state of each switch.

The coupled state designation circuit 34 generates a coupled state designation signal Qc[m] for designating the on/off state of the switch Wc[m] and a coupled state designation signal Qs[m] for designating the on/off state of the switch Ws[m] based on the designation signal SI, a latch signal LAT, and a change signal CH, and a period designation signal Tsig supplied from the control unit 2.

The switch Wc[m] switches conduction and non-conduction between the wiring Lc and the upper electrode Zu[m] of the piezoelectric element PZ[m] based on the coupled state designation signal Qc[m]. In the present embodiment, the switch Wc[m] is turned on when the coupled state designation signal Qc[m] is at a high level, and is turned off when the coupled state designation signal Qc[m] is at a low level. When the switch Wc[m] is turned on, the drive signal Com supplied to the wiring Lc is supplied to the upper electrode Zu[m] of the ejection section D[m] as the supply drive signal Vin[m].

The switch Ws[m] switches between conduction and non-conduction between the wiring Ls and the upper electrode Zu[m] of the piezoelectric element PZ[m] based on the coupled state designation signal Qs[m]. In the present embodiment, the switch Ws[m] is turned on when the coupled state designation signal Qs[m] is at a high level, and is turned off when the coupled state designation signal Qs[m] is at a low level. When the switch Ws[m] is turned on, the detection potential signal VX[m] indicating the potential of the upper electrode Zu[m] provided in the ejection section D[m] is supplied from the upper electrode Zu[m] to the detection circuit 33 via the wiring Ls.

The detection circuit 33 generates the detection signal SK[m] having a waveform corresponding to the waveform of the detection potential signal VX[m] based on the detection potential signal VX[m] supplied from the wiring Ls. Specifically, the detection circuit 33 generates a signal that is a signal obtained by amplifying the detection potential signal VX[m] and is obtained by removing the noise component from the detection potential signal VX[m], and outputs the generated signal as the detection signal SK[m].

When executing the printing process or the determination target drive process, the ink jet printer 1 sets one or more unit periods TP as an operating period of the ink jet printer 1. The ink jet printer 1 can drive each ejection section D[m] for an ejection section drive process including the printing process or the determination target drive process in each unit period TP.

Figure 6:
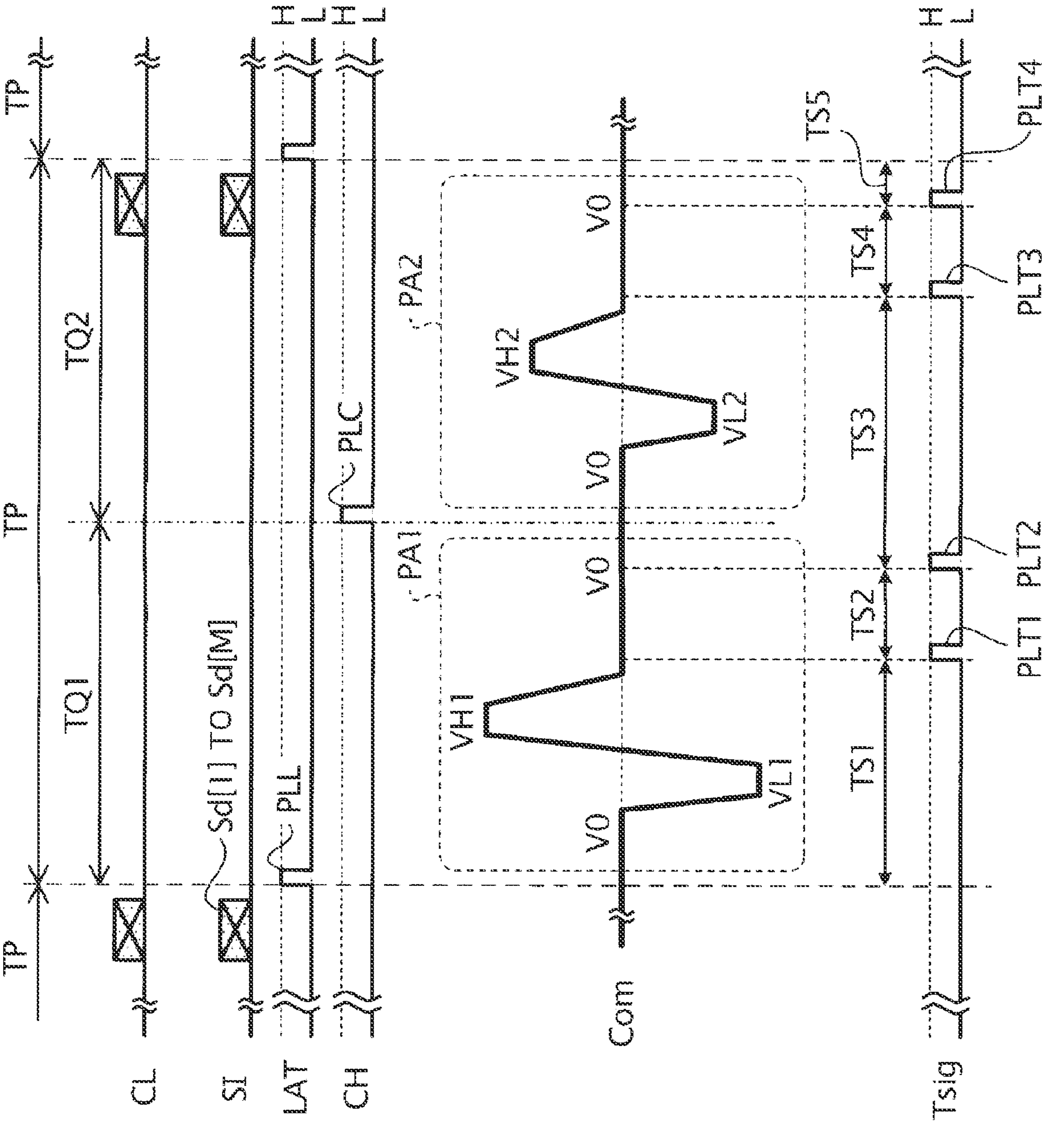
FIG. 6 is a timing chart for explaining an example of a signal supplied to the head unit.

FIG. 6 is a timing chart illustrating an example of various signals such as the drive signal Com supplied to the head unit 3 in the unit period TP.

As illustrated in FIG. 6, the control unit 2 outputs the latch signal LAT having a pulse PLL. Accordingly, the control unit 2 defines the unit period TP as a period from the rise of the pulse PLL to the rise of the next pulse PLL. In the present embodiment, the latch signal LAT is an example of a "timing signal".

In addition, the control unit 2 outputs the change signal CH having a pulse PLC in the unit period TP. Then, the control unit 2 divides the unit period TP into a drive period TQ1 from the rise of the pulse PLL to the rise of the pulse PLC and a drive period TQ2 from the rise of the pulse PLC to the rise of the pulse PLL.

Further, the control unit 2 outputs the period designation signal Tsig having a pulse PLT1, a pulse PLT2, a pulse PLT3, and a pulse PLT4 in the unit period TP. Then, the control unit 2 divides the unit period TP into a control period TS1 from the rise of the pulse PLL to the rise of the pulse PLT1, a control period TS2 from the rise of the pulse PLT1 to the rise of the pulse PLT2, a control period TS3 from the rise of the pulse PLT2 to the rise of the pulse PLT3, a control period TS4 form the rise of the pulse PLT3 to the rise of the pulse PLT4, and a control period TS5 from the rise of the pulse PLT4 to the rise of the pulse PLL.

As illustrated in FIG. 6, the designation signal SI includes M individual designation signals Sd[1] to Sd[M] corresponding to the M ejection sections D[1] to D[M] on a one-to-one basis. The individual designation signal Sd[m] designates an aspect of driving of the ejection section D[m] in each unit period TP when the ink jet printer 1 executes the printing process or the Determination target drive process. The control unit 2 synchronizes the designation signal SI including the M individual designation signals Sd[1] to Sd[M] with a clock signal CL before each unit period TP, and then supplies the synchronized designation signal SI to the coupled state designation circuit 34. Then, the coupled state designation circuit 34 generates the coupled state designation signal Qc[m] and the coupled state designation signal Qs[m] based on the individual designation signal Sd[m] in the unit period TP.

In the present embodiment, it is assumed that when the ink jet printer 1 executes the printing process or the determination target drive process, the ejection section D[m] includes any dots Dt out of large dots formed of ink having an ink amount ξ1 and small dots formed of ink having an ink amount ξ2 smaller than the ink amount ξ1.

FIGS. 7 and 8 are explanatory diagrams for explaining examples of the individual designation signal Sd[m].

As illustrated in FIGS. 7 and 8, in the present embodiment, in the unit period TP when the printing process or the determination target drive process is executed, the individual designation signal Sd[m] indicates any one of five values of a value "1" that designates the ejection section D[m] as a large dot formation ejection section DP-1, a value "2" that designates the ejection section D[m] as a small dot formation ejection section DP-2, a value "3" that designates the ejection section D[m] as a non-drive ejection section DP-3, a value "4" that designates the ejection section D[m] as a determination target ejection section DH-1, and a value of "5" that designates the ejection section D[m] as a determination target ejection section DH-2.

In this case, the large dot formation ejection section DP-1 is an ejection section D that forms large dots in the unit period TP. The small dot formation ejection section DP-2 is an ejection section D that forms small dots in the unit period TP. The non-drive ejection section DP-3 is an ejection section D that is not driven by the drive signal Com in the unit period TP. The determination target ejection section DH-1 is an ejection section D that forms large dots in the unit period TP among the determination target ejection sections DH which are targets of the ejection state determination process in the unit period TP. The determination target ejection section DH-2 is an ejection section D that forms small dots in the unit period TP among the determination target ejection sections DH which are targets of the ejection state determination process in the unit period TP.

The description will be made referring again to FIG. 6.

As illustrated in FIG. 6, in the present embodiment, the drive signal Com has a waveform PA1 provided in the drive period TQ1 and a waveform PA2 provided in the drive period TQ2.

The waveform PA1 is a waveform that moves from a reference potential V0 through a potential VL1 that is lower than the reference potential V0 and a potential VH1 that is higher than the reference potential V0, and returns to the reference potential V0 in the control period TS1 of the drive period TQ1, and maintains the reference potential V0 in the control period TS2 and the control period TS3 of the drive period TQ1. When the supply drive signal Vin[m] having the waveform PA1 is supplied to the ejection section D[m], the waveform PA1 is determined such that the ink corresponding to the ink amount ξ1 is ejected from the ejection section D[m].

Further, the waveform PA2 is a waveform that moves from the reference potential V0 through a potential VL2 that is lower than the reference potential V0 and a potential VH2 that is higher than the reference potential V0, and returns to the reference potential V0 in the control period TS3 of the drive period TQ2, and maintains the reference potential V0 in the control period TS4 and the control period TS5 of the drive period TQ2. When the supply drive signal Vin[m] having the waveform PA2 is supplied to the ejection section D[m], the waveform PA2 is determined such that the ink corresponding to the ink amount ξ2 is ejected from the ejection section D[m].

In the present embodiment, as an example, it is assumed that when the potential of the supply drive signal Vin[m] supplied to the ejection section D[m] is high, the volume of the cavity CV[m] provided in the ejection section D[m] is small as compared with a case of low potential. Therefore, when the ejection section D[m] is driven by the supply drive signal Vin[m] having the waveform PA1 or the like, the potential of the supply drive signal Vin[m] changes from a low potential to a high potential, and accordingly, the ink in the ejection section D[m] is ejected from the nozzle N.

Next, an operation of the ejection section D[m] designated by the individual designation signal Sd[m] will be described with reference to FIGS. 7 and 8.

As illustrated in FIG. 7, when the individual designation signal Sd[m] indicates the value "1" that designates the ejection section D[m] as the large dot formation ejection section DP-1 in the unit period TP, the coupled state designation circuit 34 sets the coupled state designation signal Qc[m] to a high level in the drive period TQ1. In this case, the switch Wc[m] is turned on in the drive period TQ1.

Therefore, the ejection section D[m] is driven by the supply drive signal Vin[m] having the waveform PA1 in the unit period TP, and ejects the ink having the ink amount ξ1 corresponding to the large dot.

Further, when the individual designation signal Sd[m] indicates the value "2" that designates the ejection section D[m] as the small dot formation ejection section DP-2 in the unit period TP, the coupled state designation circuit 34 sets the coupled state designation signal Qc[m] to a high level in the drive period TQ2. In this case, the switch Wc[m] is turned on in the drive period TQ2. Therefore, the ejection section D[m] is driven by the supply drive signal Vin[m] having the waveform PA2 in the unit period TP, and ejects the ink having the ink amount ξ2 corresponding to the small dot.

Further, when the individual designation signal Sd[m] indicates the value "3" that specifies the ejection section D[m] as the non-drive ejection section DP-3 in the unit period TP, the coupled state designation circuit 34 sets the coupled state designation signal Qc[m] and the coupled state designation signal Qs[m] to a low level over the unit period TP. In this case, the switch Wc[m] and the switch Ws[m] are turned off over the unit period TP. Therefore, the ejection section D[m] does not eject the ink without being driven by the drive signal Com in the unit period TP.

Further, when the individual designation signal Sd[m] indicates the value "4" that specifies the ejection section D[m] as the determination target ejection section DH-1 in the unit period TP, the coupled state designation circuit 34 sets the coupled state designation signal Qc[m] to a high level in the control period TS1, and sets the coupled state designation signal Qs[m] to a high level in the control period TS2. In this case, the switch Wc[m] is turned on in the control period TS1, and the switch Ws[m] is turned on in the control period TS2. Therefore, as a result in which the ejection section D[m] designated as the determination target ejection section DH-1 is driven by the supply drive signal Vin[m] having the waveform PA1 in the control period TS1, vibration, which occurs in the ejection section D[m], remains in the control period TS2. Then, in the control period TS2, the potential of the upper electrode Zu[m] provided in the ejection section D[m] changes due to the vibration remaining in the ejection section D[m]. Then, the detection circuit 33 detects the potential of the upper electrode Zu[m], which is changed according to the vibration remaining in the ejection section D[m], as the detection potential signal VX[m] via the switch Ws[m] in the control period TS2.

That is, the waveform of the detection potential signal VX[m] detected from the ejection section D[m] in the control period TS2 shows the waveform of the vibration remaining in the ejection section D[m] in the control period TS2. Then, the waveform of the detection signal SK[m], which is generated based on the detection potential signal VX[m] detected from the ejection section D[m] in the control period TS2, shows the waveform of the vibration remaining in the ejection section D[m] in the control period TS2.

Further, when the individual designation signal Sd[m] indicates the value "5" that specifies the ejection section D[m] as the determination target ejection section DH-2 in the unit period TP, the coupled state designation circuit 34 sets the coupled state designation signal Qc[m] to a high level in the control period TS3, and sets the coupled state designation signal Qs[m] to a high level in the control period TS4. In this case, the switch Wc[m] is turned on in the control period TS3, and the switch Ws[m] is turned on in the control period TS4. Therefore, as a result in which the ejection section D[m] designated as the determination target ejection section DH-1 is driven by the supply drive signal Vin[m] having the waveform PA2 in the control period TS3, vibration, which occurs in the ejection section D[m], remains in the control period TS4. Then, in the control period TS4, the potential of the upper electrode Zu[m] provided in the ejection section D[m] changes due to the vibration remaining in the ejection section D[m]. Then, the detection circuit 33 detects the potential of the upper electrode Zu[m], which is changed according to the vibration remaining in the ejection section D[m], as the detection potential signal VX[m] via the switch Ws[m] in the control period TS4.

That is, the waveform of the detection potential signal VX[m] detected from the ejection section D[m] in the control period TS4 indicates the waveform of the vibration remaining in the ejection section D[m] in the control period TS4. Then, the waveform of the detection signal SK[m], which is generated based on the detection potential signal VX[m] detected from the ejection section D[m] in the control period TS4, indicates the waveform of the vibration remaining in the ejection section D[m] in the control period TS4.

In the following, the control period TS2 when the vibration remaining in the determination target ejection section DH-1 is detected and the control period TS4 when the vibration remaining in the determination target ejection section DH-2 is detected are collectively referred to as a detection period TSS.

3. Overview of Determination Unit

Hereinafter, an overview of the determination unit 8 will be explained with reference to FIGS. 9 to 12.

As described above, the determination unit 8 executes an ejection state determination process of determining the ink ejection state of the ejection section D[m] designated as the determination target ejection section DH, based on the detection signal SK[m] supplied from the detection circuit 33.

Figure 9:
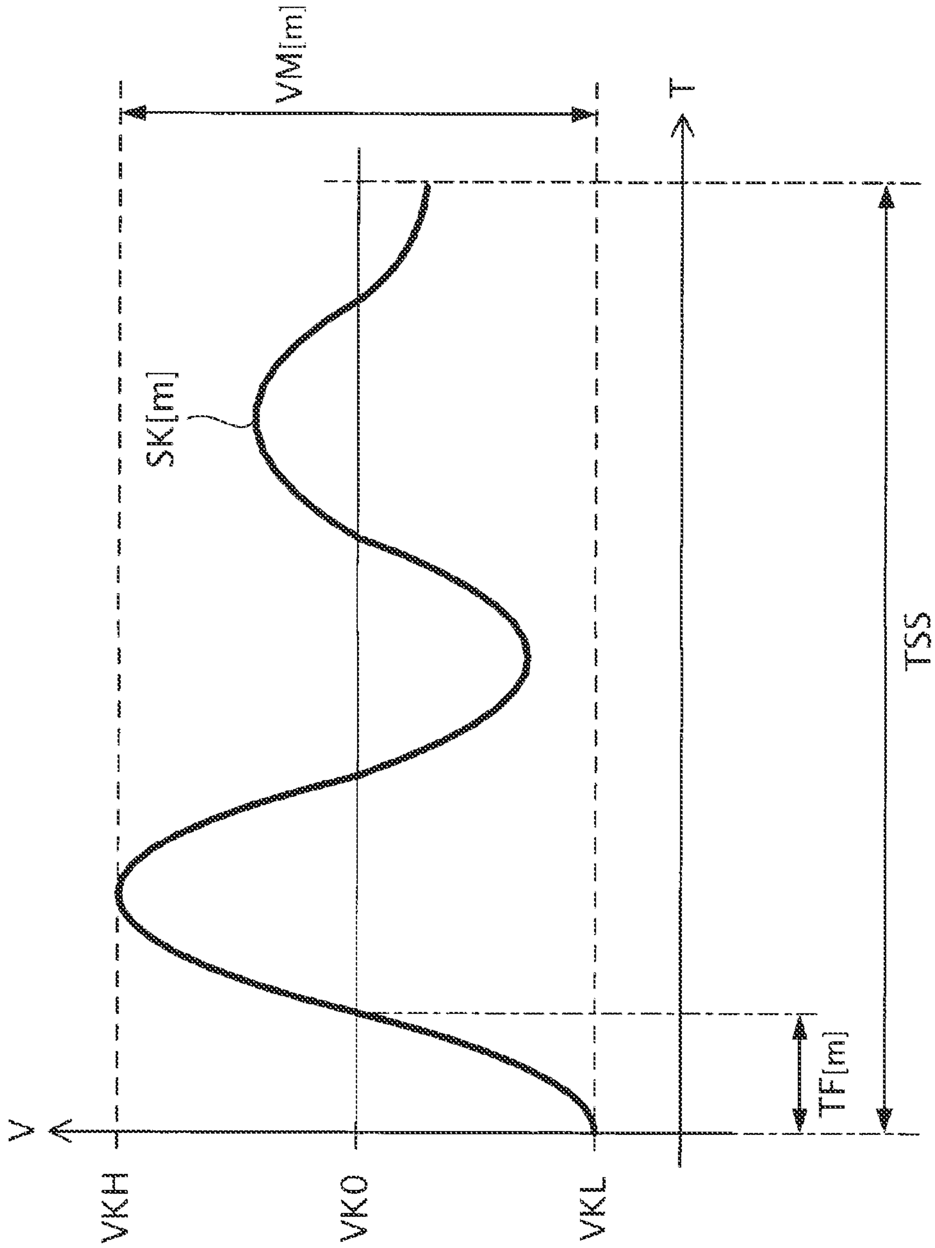
FIG. 9 is a timing chart for explaining an example of a detection signal.

FIG. 9 is an explanatory diagram for explaining an example of the detection signal SK[m] supplied to the determination unit 8 by the detection circuit 33.

As illustrated in FIG. 9, the detection circuit 33 outputs the detection signal SK[m] in the detection period TSS. The detection signal SK[m] shows a waveform based on the vibration remaining in the ejection section D[m] in the detection period TSS. Specifically, the detection signal SK[m] shows vibration attenuated between the lowest potential VKL and the highest potential VKH.

In the present embodiment, the determination unit 8 measures an amplitude VM[m] having the detection signal SK[m] and an initial time TF[m].

In this case, the amplitude VM[m] is a value corresponding to the amplitude of the detection signal SK[m]. Specifically, in the present embodiment, the amplitude VM[m] is the potential difference between the highest potential VKH and the lowest potential VKL.

In addition, the initial time TF[m] is a value corresponding to an initial phase of the detection signal SK[m]. Specifically, in the present embodiment, the initial time TF[m] is a time length from a start time of the detection period TSS to a time when the potential of the detection signal SK[m] reaches a predetermined reference potential VK0. In this case, the reference potential VK0 may be, for example, a potential at the center of the amplitude of the detection signal SK[m].

As described above, the determination unit 8 executes the ejection state determination process according to the determination mode based on the mode designation signal MS supplied from the determination management section 23.

FIGS. 10 to 12 are explanatory diagrams for explaining an example of the mode designation signal MS supplied to the determination unit 8 by the determination management section 23.

As illustrated in FIGS. 10 to 12, the mode designation signal MS includes a current ejection designation signal SG[m] corresponding to the determination target ejection section DH, a past ejection designation signal ST[m] corresponding to the determination target ejection section DH, and an adjacent ejection designation signal SR[m] corresponding to the determination target ejection section DH.

The current ejection designation signal SG[m] illustrated in FIG. 10 indicates the same value as that of the individual designation signal Sd[m] corresponding to the ejection section D[m] which is a target of the ejection state determination process.

Specifically, when the individual designation signal Sd[m] indicates the value "4" that designates the ejection section D[m] as the determination target ejection section DH-1, the current ejection designation signal SG[m] indicates the value "4". That is, when the ejection section D[m], which is the target of the ejection state determination process, is the determination target ejection section DH-1, the current ejection designation signal SG[m] indicates the value of "4".

Further, when the individual designation signal Sd[m] indicates the value "5" that designates the ejection section D[m] as the determination target ejection section DH-2, the current ejection designation signal SG[m]indicates the value "5". That is, when the ejection section D[m], which is the target of the ejection state determination process, is the determination target ejection section DH-2, the current ejection designation signal SG[m] indicates the value "5".

In the following, the value indicated by the current ejection designation signal SG[m] is referred to as a current ejection designation value $\alpha$. That is, in the present embodiment, the current ejection designation value $\alpha$ is "4" or "5".

The past ejection designation signal ST[m] illustrated in FIG. 11 is the individual designation signal Sd[m] corresponding to the ejection section D[m] which is a target of the ejection state determination process, and indicates the same value as the individual designation signal Sd[m] that designates an aspect of driving of the ejection section D[m] in an immediately preceding unit period TP of the unit period TP when the ejection state determination process is executed on the ejection section D[m].

In the following, it is assumed that the ejection section drive process including the printing process and the determination target drive process is executed in K continuous unit periods TP. In this case, a value K is a natural number that satisfies "K≥2". In the following, among the K unit periods TP when the ejection section drive process is executed, the k-th unit period TP is referred to as a unit period TP(k). In this case, a variable k is a natural number that satisfies "1≤k≤K". In the following, the ejection section D[m] in the unit period TP(k) is referred to as an ejection section D[m][TP(k)], the individual designation signal Sd[m] that designates an aspect of driving of the ejection section D[m] [TP(k)] is referred to as an individual designation signal Sd[m][TP(k)], the current ejection designation signal SG[m] corresponding to the ejection section D[m][TP(k)] is referred to as a current ejection designation signal SG[m][TP(k)], the past ejection designation signal ST[m] corresponding to the ejection section D[m][TP(k)] is referred to as a past ejection designation signal ST[m][TP(k)], and the adjacent ejection designation signal SR[m] corresponding to the ejection section D[m][TP(k)] is referred to as an adjacent ejection designation signal SR[m][TP(k)].

In this case, the past ejection designation signal ST[m][TP(k)] indicates the same value as the individual designation signal Sd[m][TP(k−1)], which is the individual designation signal Sd[m] that designates an aspect of driving the ejection section D[m] in the immediately preceding unit period TP(k−1) of the unit period TP(k).

Specifically, when the individual designation signal Sd[m][TP(k−1)] indicates the value "1" that designates the ejection section D[m][TP(k−1)] as the large dot formation ejection section DP-1, the past ejection designation signal ST[m][TP(k)] indicates the value "1". That is, when the ejection section D[m], which is a target of the ejection state determination process, is driven as the large dot formation ejection section DP-1 immediately preceding the unit period TP(k−1), the past ejection designation signal ST[m][TP(k)] indicates the value "1".

Further, when the individual designation signal Sd[m][TP(k−1)] indicates the value "2" that designates the ejection section D[m][TP(k−1)] as the small dot formation ejection section DP-2, the past ejection designation signal ST[m][TP(k)] indicates the value "2". That is, when the ejection section D[m], which is the target of the ejection state determination process, is driven as the small dot formation ejection section DP-2 immediately before the unit period TP(k−1), the past ejection designation signal ST[m][TP(k)] indicates the value "2".

Further, when the individual designation signal Sd[m][TP(k−1)] indicates the value "3" that designates the ejection section D[m][TP(k−1)] as the non-drive ejection section DP-3, the past ejection designation signal ST[m][TP(k)] indicates the value "3". That is, when the ejection section D[m], which is the target of the ejection state determination process, is the non-drive ejection section DP-3 in the immediately preceding unit period TP(k−1), the past ejection designation signal ST[m] [TP(k)] indicates the value "3".

In the following, a value indicated by the past ejection designation signal ST[m][TP(k)] is referred to as a past ejection designation value $\beta$. That is, in the present embodiment, the past ejection designation value $\beta$ is "1", "2", or "3".

The adjacent ejection designation signal SR[m][TP(k)] illustrated in FIG. 12 indicates a value based on an aspect of driving of one or more ejection sections D located in the vicinity of the ejection section D[m][TP(k)]. Specifically, in the present embodiment, the adjacent ejection designation signal SR[m][TP(k)] indicates a value, based on an individual designation signal Sd[m+1][TP(k)] that designates an aspect of driving of the ejection section D[m+1][TP(k)] adjacent to the ejection section Dm[TP(k)] via the partition wall WL[m][m+1] and an individual designation signal Sd[m−1][TP(k)] that designates an aspect of driving of the ejection section D[m−1][TP(k)] adjacent to the ejection section D[m][TP(k)] via the partition wall WL[m−1] [m].

More specifically, when the individual designation signal Sd[m+1][TP(k)] indicates the value "1" that designates the large dot formation ejection section DP-1 to the ejection section D[m+1][TP(k)], and the individual designation signal Sd[m−1][TP(k)] indicates the value "1" that designates the large dot formation ejection section DP-1 to the ejection section D[m−1][TP(k)], the adjacent ejection designation signal SR[m][TP(k)] indicates the value "1".

That is, when the ejection section D[m+1] adjacent to the ejection section D[m], which is a target of the ejection state determination process, is the large dot formation ejection section DP-1, and the ejection section D[m−1] adjacent to the ejection section D[m] is the large dot formation ejection section DP-1, the adjacent ejection designation signal SR[m][TP(k)] indicates the value "1".

Further, the individual designation signal Sd[m+1][TP(k)] indicates the value "1" that designates the large dot formation ejection section DP-1 to the ejection section D[m+1][TP(k)] and the individual designation signal Sd[m−1][TP(k)] indicates the value "2" that designates the small dot formation ejection section DP-2 to the ejection section D[m−1][TP(k)], or when the individual designation signal Sd[m+1][TP(k)] indicates the value "2" that designates the small dot formation ejection section DP-2 to the ejection section D[m+1][TP(k)] and the individual designation signal Sd[m−1][TP(k)] indicates the value "1" that designates the large dot formation ejection section DP-1 to the ejection section D[m−1][TP(k)], the adjacent ejection designation signal SR[m] indicates the value "2".

That is, when the ejection section D[m+1] adjacent to the ejection section D[m], which is a target of the ejection state determination process, is the large dot formation ejection section DP-1, and the ejection section D[m−1] adjacent to the ejection section D[m] is the small dot formation ejection section DP-2, the adjacent ejection designation signal SR[m][TP(k)] indicates the value "2". In addition, when the ejection section D[m+1] adjacent to the ejection section D[m], which is a target of the ejection state determination process, is the small dot formation ejection section DP-2, and the ejection section D[m−1] adjacent to the ejection section D[m] is the large dot formation ejection section DP-1, the adjacent ejection designation signal SR[m][TP(k)] indicates the value "2".

Further, the individual designation signal Sd[m+1][TP(k)] indicates the value "1" that designates the large dot formation ejection section DP-1 to the ejection section D[m+1][TP(k)] and the individual designation signal Sd[m−1][TP(k)] indicates the value "3" that designates the non-drive ejection section DP-3 to the ejection section D[m−1][TP(k)], or when the individual designation signal Sd[m+1][TP(k)] indicates the value "3" that designates the non-drive ejection section DP-3 to the ejection section D[m+1][TP(k)] and the individual designation signal Sd[m−1][TP(k)] indicates the value "1" that designates the large dot formation ejection section DP-1 to the ejection section D[m−1][TP(k)], the adjacent ejection designation signal SR[m] indicates the value "3".

That is, when the ejection section D[m+1] adjacent to the ejection section D[m], which is a target of the ejection state determination process, is the large dot formation ejection section DP-1, and the ejection section D[m−1] adjacent to the ejection section D[m] is the non-drive ejection section DP-3, the adjacent ejection designation signal SR[m][TP(k)] indicates the value "3". In addition, when the ejection section D[m+1] adjacent to the ejection section D[m], which is a target of the ejection state determination process, is the non-drive ejection section DP-3, and the ejection section D[m−1] adjacent to the ejection section D[m] is the large dot formation ejection section DP-1, the adjacent ejection designation signal SR[m][TP(k)] indicates the value "3".

In the present embodiment, when the variable m is "M", that is, when the ejection section D[m+1] does not exist, it is assumed that the ejection section D[m+1] is the non-drive ejection section DP-3. In addition, in the present embodiment, when the variable m is "1", that is, when the ejection section D[m−1] does not exist, it is assumed that the ejection section D[m−1] is the non-drive ejection section DP-3.

Further, when the individual designation signal Sd[m+1][TP(k)] indicates the value "2" that designates the small dot formation ejection section DP-2 to the ejection section D[m+1][TP(k)], and the individual designation signal Sd[m−1][TP(k)] indicates the value "2" that designates the small dot formation ejection section DP-2 to the ejection section D[m−1][TP(k)], the adjacent ejection designation signal SR[m][TP(k)] indicates the value "4".

That is, when the ejection section D[m+1] adjacent to the ejection section D[m], which is a target of the ejection state determination process, is the small dot formation ejection section DP-2, and the ejection section D[m−1] adjacent to the ejection section D[m] is the small dot formation ejection section DP-2, the adjacent ejection designation signal SR[m][TP(k)] indicates the value "4".

Further, the individual designation signal Sd[m+1][TP(k)] indicates the value "2" that designates the small dot formation ejection section DP-2 to the ejection section D[m+1][TP(k)] and the individual designation signal Sd[m−1][TP(k)] indicates the value "3" that designates the non-drive ejection section DP-3 to the ejection section D[m−1][TP(k)], or when the individual designation signal Sd[m+1][TP(k)] indicates the value "3" that designates the non-drive ejection section DP-3 to the ejection section D[m+1][TP(k)] and the individual designation signal Sd[m−1][TP(k)] indicates the value "2" that designates the small dot formation ejection section DP-2 to the ejection section D[m−1][TP(k)], the adjacent ejection designation signal SR[m] indicates the value "5".

That is, when the ejection section D[m+1] adjacent to the ejection section D[m], which is a target of the ejection state determination process, is the small dot formation ejection section DP-2, and the ejection section D[m−1] adjacent to the ejection section D[m] is the non-drive ejection section DP-3, the adjacent ejection designation signal SR[m][TP(k)] indicates the value "5". In addition, when the ejection section D[m+1] adjacent to the ejection section D[m], which is a target of the ejection state determination process, is the non-drive ejection section DP-3, and the ejection section D[m−1] adjacent to the ejection section D[m] is the small dot formation ejection section DP-2, the adjacent ejection designation signal SR[m][TP(k)] indicates the value "5".

Further, when the individual designation signal Sd[m+1][TP(k)] indicates the value "3" that designates the non-drive ejection section DP-3 to the ejection section D[m+1][TP(k)], and the individual designation signal Sd[m−1][TP(k)] indicates the value "3" that designates the non-drive ejection section DP-3 to the ejection section D[m−1][TP(k)], the adjacent ejection designation signal SR[m][TP(k)] indicates the value "6".

That is, when the ejection section D[m+1] adjacent to the ejection section D[m], which is a target of the ejection state determination process, is the non-drive ejection section DP-3, and the ejection section D[m−1] adjacent to the ejection section D[m] is the non-drive ejection section DP-3, the adjacent ejection designation signal SR[m][TP(k)] indicates the value "6".

In the following, a value indicated by the adjacent ejection designation signal SR[m][TP(k)] is referred to as an adjacent ejection designation value γ. That is, in the present embodiment, the adjacent ejection designation value γ is any value of "1" to "6".

As described above, in the present embodiment, the mode designation signal MS is a signal indicating the current ejection designation value α, the past ejection designation value β, and the adjacent ejection designation value γ. Then, the determination unit 8 executes the ejection state determination process by the determination mode based on the mode designation signal MS.

In the following, a determination mode of the ejection state determination process executed on the ejection section D[m][TP(k)] is referred to as a determination mode B[m][TP(k)]. In the present embodiment, the determination mode B[m][TP(k)] is determined in combination with one current correspondence determination mode BG selected from among a plurality of current correspondence determination modes BG, one past correspondence determination mode BT selected from among a plurality of past correspondence determination modes BT, and one adjacent correspondence determination mode BR selected from among a plurality of adjacent correspondence determination modes BR.

In the present embodiment, the plurality of current correspondence determination modes BG include a large dot determination mode BG1 and a small dot determination mode BG2.

In this case, the large dot determination mode BG1 is a current correspondence determination mode BG when the current ejection designation value α indicated by the current ejection designation signal SG[m][TP(k)] is "4". That is, when the ejection section D[m][TP(k)], which is a target of the ejection state determination process, is the determination target ejection section DH-1, the large dot determination mode BG1 is selected as the current correspondence determination mode BG.

Further, the small dot determination mode BG2 is a current correspondence determination mode BG when the current ejection designation value α indicated by the current ejection designation signal SG[m][TP(k)] is "5". That is, when the ejection section D[m][TP(k)], which is a target of the ejection state determination process, is the determination target ejection section DH-2, the small dot determination mode BG2 is selected as the current correspondence determination mode BG.

Further, in the present embodiment, the plurality of past correspondence determination modes BT include a large dot determination mode BT1, a small dot determination mode BT2, and a non-drive determination mode BT3.

In this case, the large dot determination mode BT1 is a past correspondence determination mode BT when the past ejection designation value β indicated by the past ejection designation signal ST[m][TP(k)] is "1". That is, when the ejection section D[m], which is a target of the ejection state determination process, is driven as the large dot formation ejection section DP-1 in the immediately preceding the unit period TP(k−1), the large dot determination mode BT1 is selected as the past correspondence determination mode BT.

Further, the small dot determination mode BT2 is a past correspondence determination mode BT when the past ejection designation value β indicated by the past ejection designation signal ST[m][TP(k)] is "2". That is, when the ejection section D[m], which is the target of the ejection state determination process, is driven as the small dot formation ejection section DP-2 immediately before the unit period TP(k−1), the small dot determination mode BT2 is selected as the past correspondence determination mode BT.

Further, the non-drive determination mode BT3 is a past correspondence determination mode BT when the past ejection designation value β indicated by the past ejection designation signal ST[m][TP(k)] is "3". That is, when the ejection section D[m], which is a target of the ejection state determination process, is the non-drive ejection section DP-3 in the immediately preceding the unit period TP(k−1), the non-drive determination mode BT3 is selected as the past correspondence determination mode BT.

Further, in the present embodiment, the plurality of adjacent correspondence determination mode BR includes a large dot determination mode BR1, a large dot determination mode BR2, a large dot determination mode BR3, a small dot determination mode BR4, a small dot determination mode BR5, and a non-drive determination mode BR6.

In this case, the large dot determination mode BR1 is an adjacent correspondence determination mode BR when the adjacent ejection designation value γ indicated by the adjacent ejection designation signal SR[m][TP(k)] is "1". That is, when the ejection section D[m] is selected as the determination target ejection section DH, which is a target of the ejection state determination process, the ejection section D[m+1] adjacent to the ejection section D[m] is the large dot formation ejection section DP-1, and when the ejection section D[m−1] adjacent to the ejection section D[m] is the large dot formation ejection section DP-1, the large dot determination mode BR1 is selected as the adjacent correspondence determination mode BR.

Further, the large dot determination mode BR2 is an adjacent correspondence determination mode BR when the adjacent ejection designation value γ indicated by the adjacent ejection designation signal SR[m][TP(k)] is "2". That is, when the ejection section D[m] is selected as the determination target ejection section DH which is a target of the ejection state determination process, the ejection section D[m+1] adjacent to the ejection section D[m] is the large dot formation ejection section DP-1, and when the ejection section D[M-1] adjacent to the ejection section D[m] is the small dot formation ejection section DP-2, the large dot determination mode BR2 is selected as the adjacent correspondence determination mode BR. In addition, when the ejection section D[m] is selected as the determination target ejection section DH, which is a target of the ejection state determination process, the ejection section D[m+1] adjacent to the ejection section D[m] is the small dot formation ejection section DP-2, and when the ejection section D[m−1] adjacent to the ejection section D[m] is the large dot formation ejection section DP-1, the large dot determination mode BR2 is selected as the adjacent correspondence determination mode BR.

Further, the large dot determination mode BR3 is an adjacent correspondence determination mode BR when the adjacent ejection designation value γ indicated by the adjacent ejection designation signal SR[m][TP(k)] is "3". That is, when the ejection section D[m] is selected as the determination target ejection section DH which is a target of the ejection state determination process, the ejection section D[m+1] adjacent to the ejection section D[m] is the large dot formation ejection section DP-1, and when the ejection section D[M-1] adjacent to the ejection section D[m] is the non-drive ejection section DP-3, the large dot determination mode BR3 is selected as the adjacent correspondence determination mode BR. In addition, when the ejection section D[m] is selected as the determination target ejection section DH, which is a target of the ejection state determination process, the ejection section D[m+1] adjacent to the ejection section D[m] is the non-drive ejection section DP-3, and when the ejection section D[m−1] adjacent to the ejection section D[m] is the large dot formation ejection section DP-1, the large dot determination mode BR3 is selected as the adjacent correspondence determination mode BR.

Further, the small dot determination mode BR4 is an adjacent correspondence determination mode BR when the adjacent ejection designation value γ indicated by the adjacent ejection designation signal SR[m][TP(k)] is "4". That is, when the ejection section D[m] is selected as the determination target ejection section DH which is a target of the ejection state determination process, the ejection section D[m+1] adjacent to the ejection section D[m] is the small dot formation ejection section DP-2, and when the ejection section D[M-1] adjacent to the ejection section D[m] is the small dot formation ejection section DP-2, the small dot determination mode BR4 is selected as the adjacent correspondence determination mode BR.

Further, the small dot determination mode BR5 is an adjacent correspondence determination mode BR when the adjacent ejection designation value γ indicated by the adjacent ejection designation signal SR[m][TP(k)] is "5". That is, when the ejection section D[m] is selected as the determination target ejection section DH which is a target of the ejection state determination process, the ejection section D[m+1] adjacent to the ejection section D[m] is the small dot formation ejection section DP-2, and when the ejection section D[M-1] adjacent to the ejection section D[m] is the non-drive ejection section DP-3, the small dot determination mode BR5 is selected as the adjacent correspondence determination mode BR. In addition, when the ejection section D[m] is selected as the determination target ejection section DH, which is a target of the ejection state determination process, the ejection section D[m+1] adjacent to the ejection section D[m] is the non-drive ejection section DP-3, and when the ejection section D[m−1] adjacent to the ejection section D[m] is the small dot formation ejection section DP-2, the small dot determination mode BR5 is selected as the adjacent correspondence determination mode BR.

Further, the non-drive determination mode BR6 is an adjacent correspondence determination mode BR when the adjacent ejection designation value γ indicated by the adjacent ejection designation signal SR[m][TP(k)] is "6". That is, when the ejection section D[m] is selected as the determination target ejection section DH which is a target of the ejection state determination process, the ejection section D[m+1] adjacent to the ejection section D[m] is the non-drive ejection section DP-3, and when the ejection section D[M−1] adjacent to the ejection section D[m] is the non-drive ejection section DP-3, the non-drive determination mode BR6 is selected as the adjacent correspondence determination mode BR.

In the present embodiment, in the ejection state determination process for the ejection section D[m][TP(k)], the determination unit 8 generates determination information SH[m] indicating that the ejection state of the ejection section D[m][TP(k)] is normal, when an amplitude determination condition in which the amplitude VM[m] is greater than or equal to a threshold VM-L(α, β, γ) and less than or equal to a threshold VM-H(α, β, γ) is satisfied, and when a phase determination condition in which the initial time TF[m] is greater than or equal to a threshold TF-L(α, β, γ) and less than or equal to a threshold TF-H(α, β, γ) is satisfied. On the other hand, the determination unit 8 generates determination information SH[m] indicating that the ejection state of the ejection section D[m][TP(k)] is abnormal, when the amplitude VM[m] does not satisfy the amplitude determination condition and the initial time TF[m] does not satisfy the phase determination condition.

The threshold VM-L(α, β, γ) and the threshold VM-H(α, β, γ) are real numbers that satisfy "0<VM-L(α, β, γ)<VM-H(α, β, γ)", and the threshold TF-L(α, β, γ) and the threshold TF-H(α, β, γ) are real numbers that satisfy "0<TF-L(α, β, γ)<TF-H(α, β, γ".

In the following, four determination thresholds of the threshold VM-L(α, β, γ), the threshold VM-H(α, β, γ), the threshold TF-L(α, β, γ), and the threshold TF-H(α, β, γ), which are used in the ejection state determination process for the ejection section D[m][TP(k)], are determined based on the determination mode B[m][TP(k)] according to the ejection state determination process. That is, in the present embodiment, the threshold VM-L(α, β, γ), the threshold VM-H(α, β, γ), the threshold TF-L(α, β, γ), and the threshold TF-H(α, β, γ), which are used in the ejection state determination process for the ejection section D[m][TP(k)], are determined based on the current correspondence determination mode BG selected in the ejection state determination process, the past correspondence determination mode BT selected in the ejection state determination process, and the adjacent correspondence determination mode BR selected in the ejection state determination process. In other words, in the present embodiment, the threshold VM-L(α, β, γ), the threshold VM-H(α, β, γ), the threshold TF-L(α, β, γ), and the threshold TF-H(α, β, γ), which are used in the ejection state determination process for the ejection section D[m][TP(k)], are determined based on the current ejection designation value α indicating the current ejection designation signal SG[m][TP(k)], the past ejection designation value β indicating the past ejection designation signal ST[m][TP(k)], and the adjacent ejection designation value γ indicating the adjacent ejection designation signal SR[m][TP(k)]. In the following, the threshold VM-L(α, β, γ), the threshold VM-H(α, β, γ), the threshold TF-L(α, β, γ), and the threshold TF-H(α, β, γ) are collectively referred to as a "determination threshold".

When the ejection section D[m+1] is driven as the large dot formation ejection section DP-1 or the small dot formation ejection section DP-2, the pressure fluctuation accompanying the driving causes a so-called "crosstalk" that affects the ejection section D[m] via the partition wall WL[m][m+1] and the reservoir 325. Therefore, when the ejection section D[m+1] is driven as the large dot formation ejection section DP-1 or the small dot formation ejection section DP-2, the amplitude VM[m] of the detection signal SK[m] based on the detection potential signal VX[m], which is detected from the ejection section D[m], increases and the initial time TF[m] of the detection signal SK[m] based on the detection potential signal VX[m], which is detected from the ejection section D[m], decreases, as compared to when the ejection section D[m+1] is not driven as the large dot formation ejection section DP-1 or the small dot formation ejection section DP-2. The same applies when the ejection section D[m−1] is driven as the large dot formation ejection section DP-1 or the small dot formation ejection section DP-2.

Therefore, in the present embodiment, in the ejection state determination process for the ejection section D[m], when the ejection section D in the vicinity of the ejection section D[m] is driven, the determination threshold is determined such that the threshold VM-L(α, β, γ) and the threshold VM-H(α, β, γ) becomes larger and the threshold TF-L(α, β, γ) and the threshold TF-H(α, β, γ) becomes smaller as compared to when the ejection section D in the vicinity of the ejection section D[m] is not driven.

Specifically, in the present embodiment, in the small dot determination mode BR5, the determination threshold is determined such that the threshold VM-L(α, β, γ) and the threshold VM-H(α, β, γ) becomes larger and the threshold TF-L(α, β, γ) and the threshold TF-H(α, β, γ) becomes smaller as compared to the non-drive determination mode BR6. In addition, in the present embodiment, in the small dot determination mode BR4, the determination threshold is determined such that the threshold VM-L(α, β, γ) and the threshold VM-H(α, β, γ) becomes larger and the threshold TF-L(α, β, γ) and the threshold TF-H(α, β, γ) becomes smaller as compared to the small dot determination mode BR5. In addition, in the present embodiment, in the large dot determination mode BR2, the determination threshold is determined such that the threshold VM-L(α, β, γ) and the threshold VM-H(α, β, γ) becomes larger and the threshold TF-L(α, β, γ) and the threshold TF-H(α, β, γ) becomes smaller as compared to the small dot determination mode BR4. In addition, in the present embodiment, in the large dot determination mode BR2, the determination threshold is determined such that the threshold VM-L(α, β, γ) and the threshold VM-H(α, β, γ) becomes larger and the threshold TF-L(α, β, γ) and the threshold TF-H(α, β, γ) becomes smaller as compared to the large dot determination mode BR3. In addition, in the present embodiment, in the large dot determination mode BR1, the determination threshold is determined such that the threshold VM-L(α, β, γ) and the threshold VM-H(α, β, γ) becomes larger and the threshold TF-L(α, β, γ) and the threshold TF-H(α, β, γ) becomes smaller as compared to the large dot determination mode BR2.

When a size of a dot Dt formed by the ejection section D[m] is the same as a size of a dot Dt formed by the ejection section D[m+1], the pressure fluctuation accompanying the driving of the ejection section D[m+1] significantly affects the ejection section D[m] as compared to when the size of the dot Dt formed by the ejection section D[m] is different from the size of the dot Dt formed by the ejection section D[m+1]. Therefore, in the ejection state determination process for the ejection section D[m], when the size of the dot Dt formed by the ejection section D[m] is the same as the size of the dot Dt formed by the ejection section D[m+1], the determination threshold may be determined such that the threshold VM-L(α, β, γ) and the threshold VM-H(α, β, γ) becomes larger and the threshold TF-L(α, β, γ) and the threshold TF-H(α, β, γ) becomes smaller as compared to when the size of the dot Dt formed by the ejection section D[m] is different from the size of the dot Dt formed by the ejection section D[m+1].

Specifically, as the ejection state determination process for the ejection section D[m], in the ejection state determination process in which the current correspondence determination mode BG is the large dot determination mode BG1, when the adjacent correspondence determination mode BR is the large dot determination mode BR1, the determination threshold may be determined such that the threshold VM-L(α, β, γ) and the threshold VM-H(α, β, γ) becomes larger and the threshold TF-L(α, β, γ) and the threshold TF-H(α, β, γ) becomes smaller as compared to when the adjacent correspondence determination mode BR is the small dot determination mode BR4. In addition, as the ejection state determination process for the ejection section D[m], in the ejection state determination process in which the current correspondence determination mode BG is the large dot determination mode BG1, when the adjacent correspondence determination mode BR is the large dot determination mode BR3, the determination threshold may be determined such that the threshold VM-L(α, β, γ) and the threshold VM-H(α, β, γ) becomes larger and the threshold TF-L(α, β, γ) and the threshold TF-H(α, β, γ) becomes smaller as compared to when the adjacent correspondence determination mode BR is the small dot determination mode BR5. In addition, as the ejection state determination process for the ejection section D[m], in the ejection state determination process in which the current correspondence determination mode BG is the small dot determination mode BG2, when the adjacent correspondence determination mode BR is the small dot determination mode BR4, the determination threshold may be determined such that the threshold VM-L(α, β, γ) and the threshold VM-H(α, β, γ) becomes larger and the threshold TF-L(α, β, γ) and the threshold TF-H(α, β, γ) becomes smaller as compared to when the adjacent correspondence determination mode BR is the large dot determination mode BR1. In addition, as the ejection state determination process for the ejection section D[m], in the ejection state determination process in which the current correspondence determination mode BG is the small dot determination mode BG2, when the adjacent correspondence determination mode BR is the small dot determination mode BR5, the determination threshold may be determined such that the threshold VM-L(α, β, γ) and the threshold VM-H(α, β, γ) becomes larger and the threshold TF-L(α, β, γ) and the threshold TF-H(α, β, γ) becomes smaller as compared to when the adjacent correspondence determination mode BR is the large dot determination mode BR3.

4. Generation of Designation Signal by Control Unit

Hereinafter, the generation of the designation signal SI by the ejection control section 22 provided in the control unit 2 will be described with reference to FIGS. 13 to 16. In the following, a process of generating the designation signal SI is referred to as a designation signal generation process.

Figure 13:
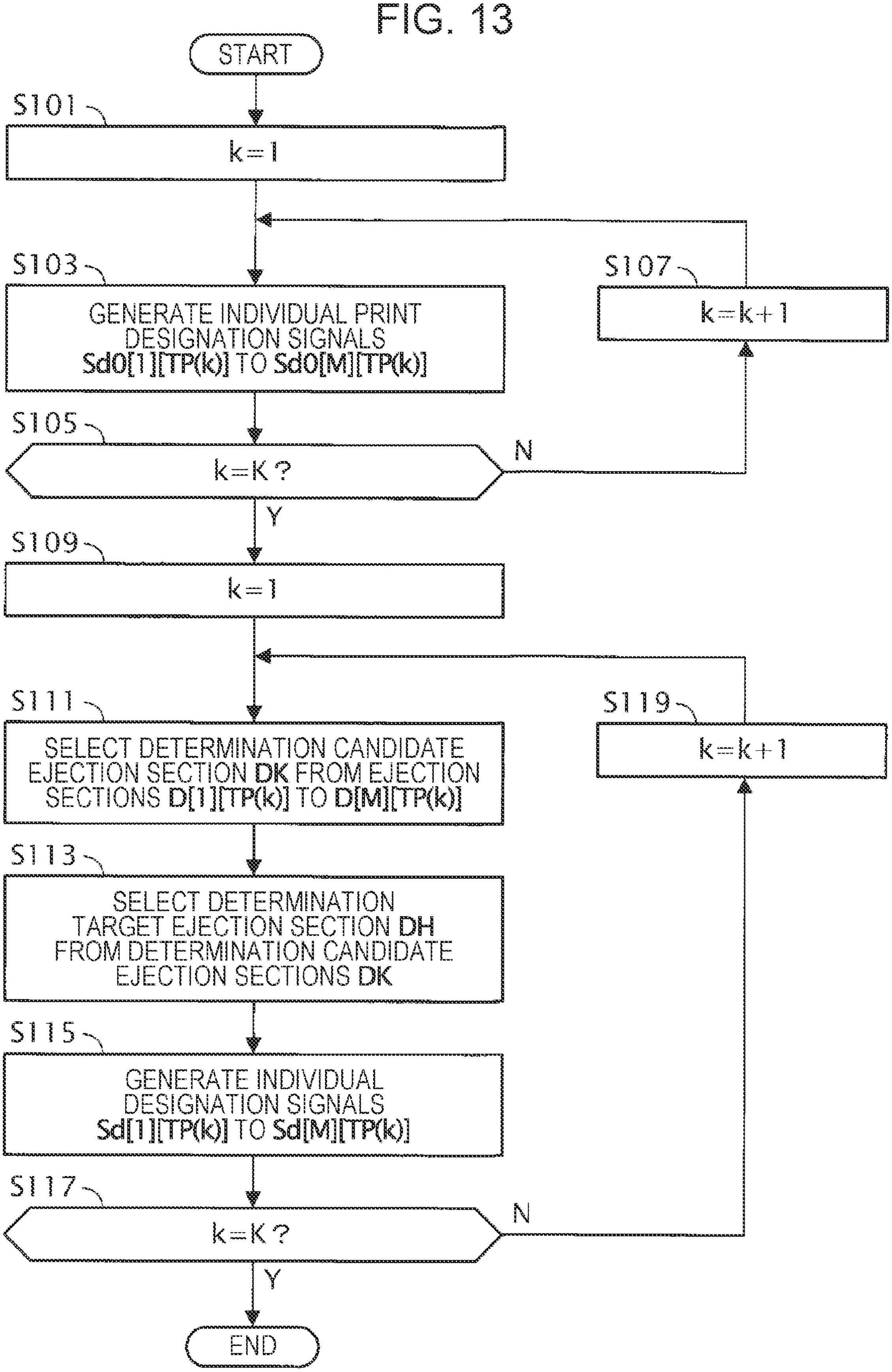
FIG. 13 is a flowchart for explaining an example of a designation signal generation process.

FIG. 13 is a flowchart illustrating an example of an operation of the control unit 2 when the designation signal generation process is executed.

As illustrated in FIG. 13, in the designation signal generation process, first, the ejection control section 22 sets a variable k to “1” (S101).

Next, the ejection control section 22 generates a print designation signal SI0[TP(k)] including individual print designation signals Sd0[1][TP(k)] to Sd0[M] [TP(k)] based on the print data Img (S103).

In this case, the print designation signal SI0[TP(k)] is a signal that designates an aspect of driving of M ejection sections D[1] to D[M] having the head units 3 in the unit period TP(k), which is necessary for forming an image indicating the print data Img on the recording paper PP, when it is presumed that the ejection state determination process and the determination target drive process are not executed.

In addition, the individual print designation signal Sd0 [*m*][TP(k)] is a signal that designates an aspect of driving of the ejection section D[m] in the unit period TP(k), which is necessary for forming an image indicating the print data Img on the recording paper PP, when it is presumed that the ejection state determination process and the determination target drive process are not executed. Specifically, the individual print designation signal Sd0[*m*][TP(k)] indicates any one value among three values of the value “1” that designates the ejection section D[m][TP(k)] as the large dot formation ejection section DP-1, the value “2” that designates the ejection section D[m][TP(k)] as the small dot formation ejection section DP-2, and the value “3” that designates the ejection section D[m][TP(k)] as the non-drive ejection section DP-3, in the unit period TP(k).

Next, the ejection control section 22 determines whether or not the value k satisfies "k=K" (S105).

Then, when the result of determination in the step S105 is negative, the ejection control section 22 adds "1" to the value k (S107), and the process proceeds to step S103. When the result of determination in step S105 is positive, the ejection control section 22 sets the value k to "1" (S109).

Next, the ejection control section 22 selects one or more determination candidate ejection sections DK from among the ejection sections D[1][TP(k)] to D[M][TP(k)](Sill). In this case, the determination candidate ejection section DK is an ejection section D that may be the determination target ejection section DH among the ejection sections D[1] [TP (k)] to D[M] [TP(k)]. In the present embodiment, when the individual print designation signal Sd0[*m*][TP(k)] designates the ejection section D[m][TP(k)] as the large dot formation ejection section DP-1, the ejection section D[m] [TP(k)] may be the determination target ejection section DH-1. In addition, in the present embodiment, when the individual print designation signal Sd0[*m*] [TP(k)] designates the ejection section D[m][TP(k)] as the small dot formation ejection section DP-2, the ejection section D[m] [TP(k)] may be the determination target ejection section DH-2. That is, in the present embodiment, the determination candidate ejection section DK is an ejection section D[m] [TP(k)], which is designated as the large dot formation ejection section DP-1 by the individual print designation signal Sd0[*m*][TP(k)], and the ejection section D[m][TP(k)], which is designated as the small dot formation ejection section DP-2 by the individual print designation signal Sd0[*m*][TP(k)], among the ejection sections D[1][TP(k)] to D[M] [TP(k)].

Next, the ejection control section 22 selects one determination target ejection section DH from the one or more determination candidate ejection sections DK selected in step S111 (S113).

Specifically, in step S113, the ejection control section 22 selects, as the determination target ejection section DH, the ejection section D[m], which can perform the ejection state determination process using the large dot determination mode BG1, among one or more determination candidate ejection sections DK, by prioritizing the same over the ejection section D[m], which can perform the ejection state determination process using the small dot determination mode BG2.

In this case, the ejection section D[m], which can perform the ejection state determination process using the large dot determination mode BG1, is the ejection section D[m][TP (k)] in which the individual print designation signal Sd0[TP (k)] is designated as the large dot formation ejection section DP-1. In addition, the ejection section D[m], which can perform the ejection state determination process using the small dot determination mode BG2, is the ejection section D[m][TP(k)] in which the individual print designation signal Sd0[*m*][TP(k)] is designated as the small dot formation ejection section DP-2.

Specifically, in step S113, the ejection control section 22 selects, as the determination target ejection section DH, the ejection section D[m], which can perform the ejection state determination process using the non-drive determination mode BT3, among one or more determination candidate ejection sections DK, by prioritizing the same over the ejection section D[m], which can perform the ejection state determination process using the small dot determination mode BT2, or the ejection control section 22 selects, as the determination target ejection section DH, the ejection section D[m], which can perform the ejection state determination process using the small dot determination mode BT2, by prioritizing the same over the ejection section D[m], which can perform the ejection state determination process using the large dot determination mode BT1.

In this case, the ejection section D[m], which can perform the ejection state determination process using the large dot determination mode BT1, is the ejection section D[m] in which the individual print designation signal Sd0[*m*][TP(k)] is designated as the large dot formation ejection section DP-1 in the immediately preceding unit period TP(k−1) when the ejection state determination process for the ejection section D[m][TP(k)] is executed. In addition, the ejection section D[m], which can perform the ejection state determination process using the small dot determination mode BT2, is the ejection section D[m] in which the individual print designation signal Sd0[TP(k)] is designated as the small dot formation ejection section DP-2 in the immediately preceding unit period TP(k−1) when the ejection state determination process for the ejection section D[m][TP(k)] is executed. In addition, the ejection section D[m], which can perform the ejection state determination process using the non-drive determination mode BT3, is the ejection section D[m] in which the individual print designation signal Sd0[*m*][TP(k−1)] is designated as the non-drive ejection section DP-3 in the immediately preceding unit period TP(k−1) when the ejection state determination process for the ejection section D[m][TP(k)] is executed.

Further, in step S113, the ejection control section 22 selects, as the determination target ejection section DH, the ejection section D[m], which can perform the ejection state determination process using the non-drive determination mode BR6, among one or more determination candidate ejection sections DK, by prioritizing the same over the ejection section D[m], which can perform the ejection state determination process using the small dot determination mode BR5, the ejection control section 22 selects, as the determination target ejection section DH, the ejection section D[m], which can perform the ejection state determination process using the small dot determination mode BR5 by prioritizing the same over the ejection section D[m], which can perform the ejection state determination process using the small dot determination mode BR4, the ejection control section 22 selects, as the determination target ejection section DH, the ejection section D[m], which can perform the ejection state determination process using the small dot determination mode BR5 by prioritizing the same over the ejection section D[m], which can perform the ejection state determination process using the large dot determination mode BR3, the ejection control section 22 selects, as the determination target ejection section DH, the ejection section D[m], which can perform the ejection state determination process using the small dot determination mode BR4 by prioritizing the same over the ejection section D[m], which can perform the ejection state determination process using the large dot determination mode BR2, the ejection control section 22 selects, as the determination target ejection section DH, the ejection section D[m], which can perform the ejection state determination process using the large dot determination mode BR3 by prioritizing the same over the ejection section D[m], which can perform the ejection state determination process using the large dot determination mode BR2, or the ejection control section 22 selects, as the determination target ejection section DH, the ejection section D[m], which can perform the ejection state determination process using the large dot determination mode BR2 by prioritizing the same over the ejection section D[m], which can perform the ejection state determination process using the large dot determination mode BR1.

In this case, the ejection section D[m], which can perform the ejection state determination process using the large dot determination mode BR1, is the ejection section D[m] in which the ejection section D[m+1] adjacent to the ejection section D[m] is designated as the large dot formation ejection section DP-1 by the individual print designation signal Sd0[m+1] or in which the ejection section D[m−1] adjacent to the ejection section D[m] is designated as the large dot formation ejection section DP-1 by the individual print designation signal Sd0[m−1].

In addition, the ejection section D[m], which can perform the ejection state determination process using the large dot determination mode BR2, is the ejection section D[m] in which the ejection section D[m+1] adjacent to the ejection section D[m] is designated as the large dot formation ejection section DP-1 by the individual print designation signal Sd0[m+1] and in which the ejection section D[m−1] adjacent to the ejection section D[m] is designated as the small dot formation ejection section DP-2 by the individual print designation signal Sd0[m−1], or is the ejection section D[m] in which the ejection section D[m+1] adjacent to the ejection section D[m] is designated as the small dot formation ejection section DP-2 by the individual print designation signal Sd0[m+1] and in which the ejection section D[m−1] adjacent to the ejection section D[m] is designated as the large dot formation ejection section DP-1 by the individual print designation signal Sd0[m−1].

In addition, the ejection section D[m], which can perform the ejection state determination process using the large dot determination mode BR3, is the ejection section D[m] in which the ejection section D[m+1] adjacent to the ejection section D[m] is designated as the large dot formation ejection section DP-1 by the individual print designation signal Sd0[m+1] and in which the ejection section D[m−1] adjacent to the ejection section D[m] is designated as the non-drive ejection section DP-3 by the individual print designation signal Sd0[m−1], or is the ejection section D[m] in which the ejection section D[m+1] adjacent to the ejection section D[m] is designated as the non-drive ejection section DP-3 by the individual print designation signal Sd0[m+1] and in which the ejection section D[m−1] adjacent to the ejection section D[m] is designated as the large dot formation ejection section DP-1 by the individual print designation signal Sd0[m−1].

In addition, the ejection section D[m], which can perform the ejection state determination process using the small dot determination mode BR4, is the ejection section D[m] in which the ejection section D[m+1] adjacent to the ejection section D[m] is designated as the small dot formation ejection section DP-2 by the individual print designation signal Sd0[m+1] and in which the ejection section D[m−1] adjacent to the ejection section D[m] is designated as the small dot formation ejection section DP-2 by the individual print designation signal Sd0[m−1].

In addition, the ejection section D[m], which can perform the ejection state determination process using the small dot determination mode BR5, is the ejection section D[m] in which the ejection section D[m+1] adjacent to the ejection section D[m] is designated as the small dot formation ejection section DP-2 by the individual print designation signal Sd0[m+1] and in which the ejection section D[m−1] adjacent to the ejection section D[m] is designated as the non-drive ejection section DP-3 by the individual print designation signal Sd0[m−1], or is the ejection section D[m] in which the ejection section D[m+1] adjacent to the ejection section D[m] is designated as the non-drive ejection section DP-3 by the individual print designation signal Sd0[m+1] and in which the ejection section D[m−1] adjacent to the ejection section D[m] is designated as the small dot formation ejection section DP-2 by the individual print designation signal Sd0[m−1].

In addition, the ejection section D[m], which can perform the ejection state determination process using the non-drive determination mode BR6, is the ejection section D[m] in which the ejection section D[m+1] adjacent to the ejection section D[m] is designated as the non-drive ejection section DP-3 by the individual print designation signal Sd0[m+1] and in which the ejection section D[m−1]adjacent to the ejection section D[m] is designated as the non-drive ejection section DP-3 by the individual print designation signal Sd0[m−1].

Next, the ejection control section 22 generates the designation signal SI[TP(k)] including the individual designation signals Sd[1][TP(k)] to Sd[M][TP(k)] based on the selection result of the determination target ejection section DH in step S113, by updating the print designation signal SI0[TP(k)] generated in step S103 (S115).

Next, the ejection control section 22 determines whether or not the value k satisfies "k=K" (S117).

Then, when the result of determination in step S117 is negative, the ejection control section 22 adds "1" to the value k (S119), and the process proceeds to step S111. On the other hand, when the result of determination in step S117 is positive, the ejection control section 22 ends the designation signal generation process illustrated in FIG. 13.

Figure 14:
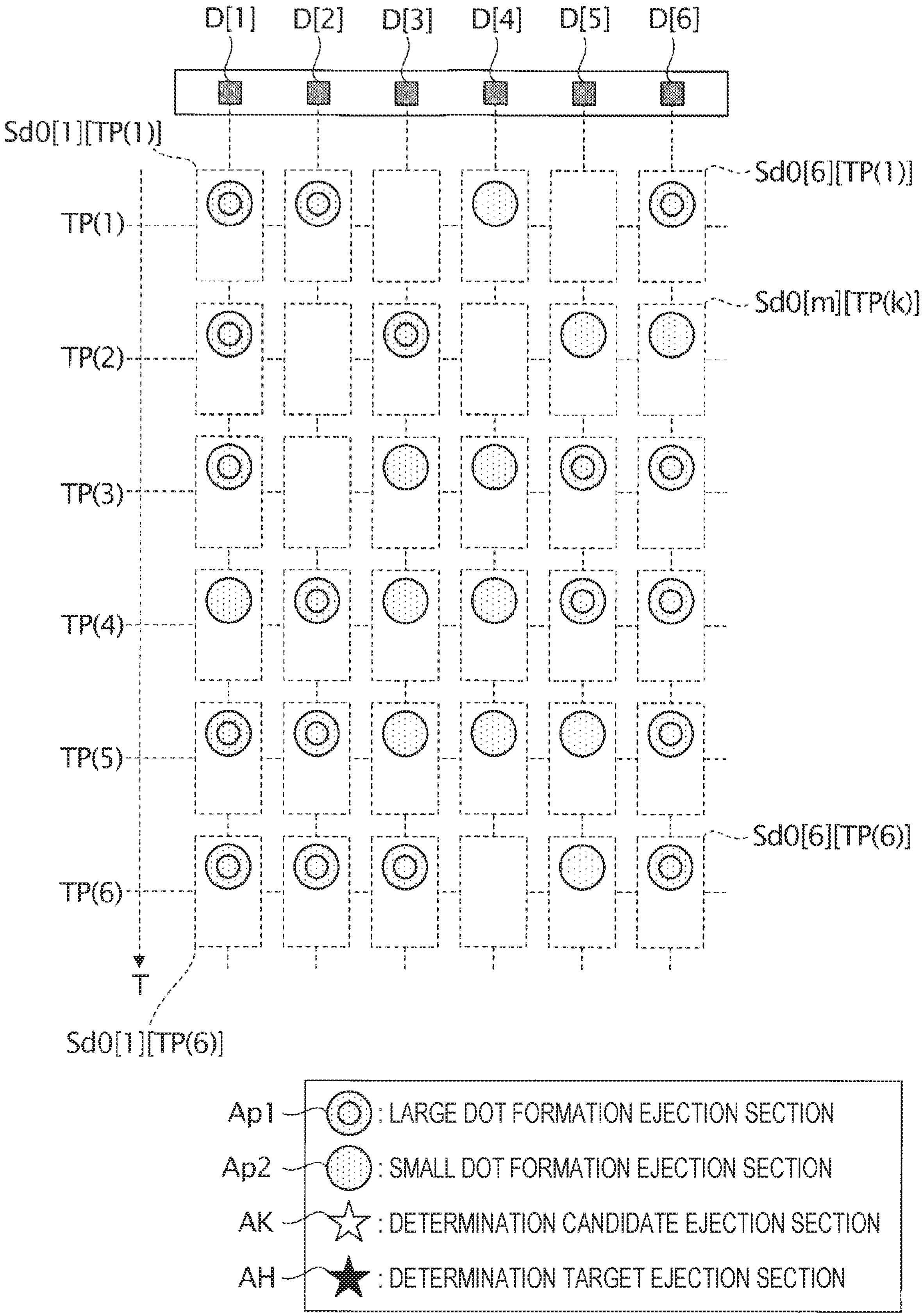
FIG. 14 is an explanatory diagram for explaining an example of a print designation signal and a designation signal.
Figure 15:
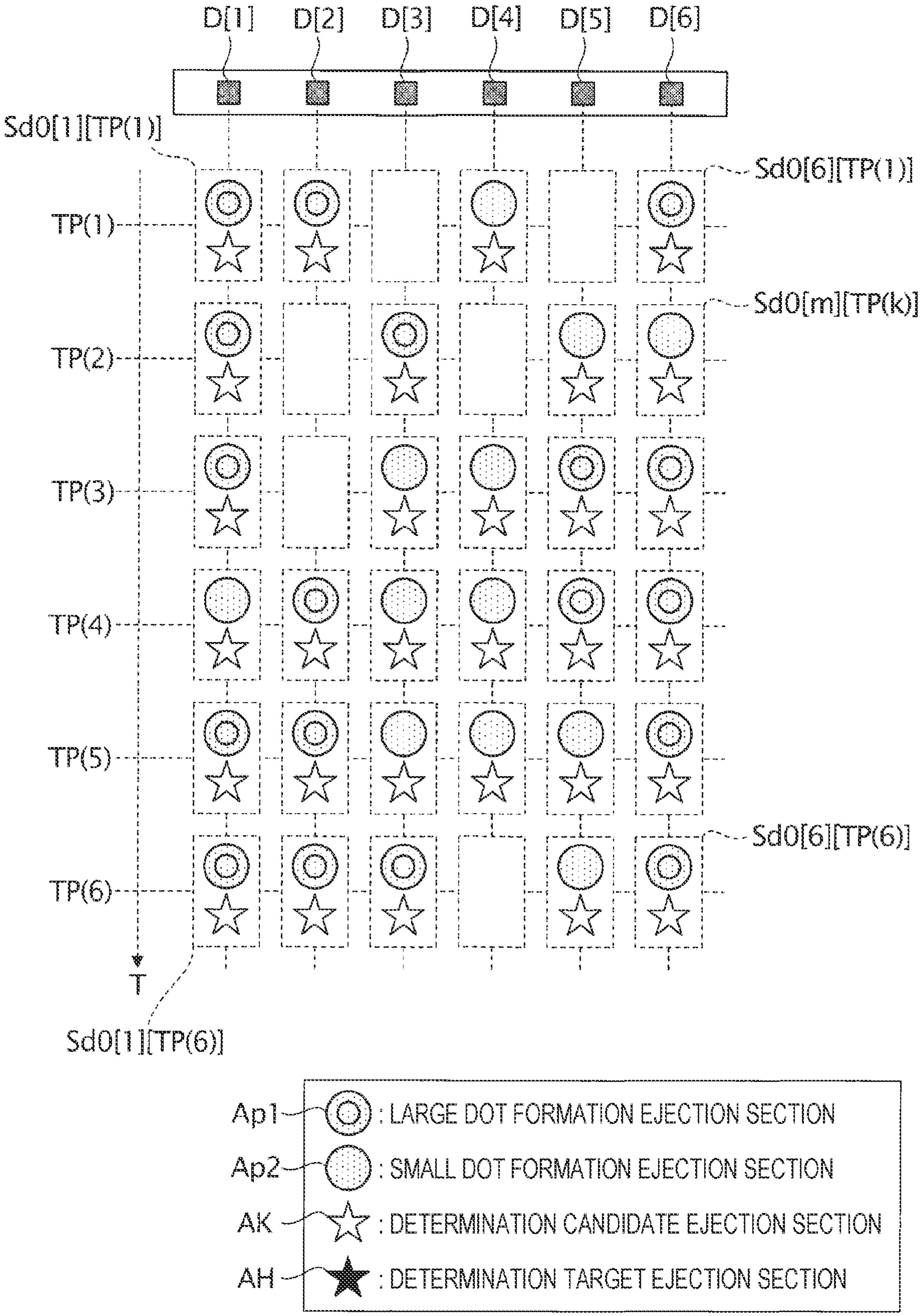
FIG. 15 is an explanatory diagram for explaining an example of a print designation signal and a designation signal.
Figure 16:
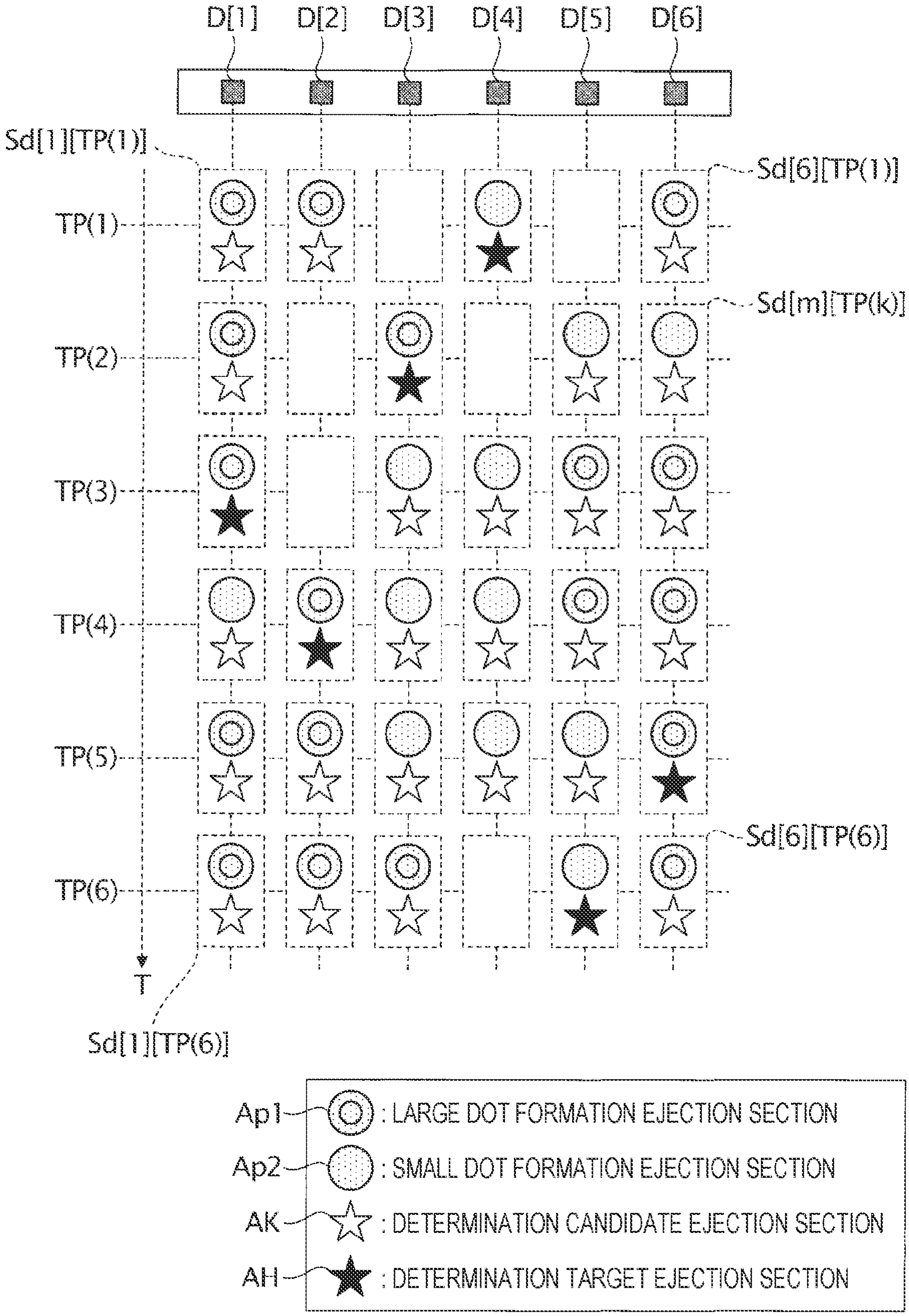
FIG. 16 is an explanatory diagram for explaining an example of a print designation signal and a designation signal.

FIGS. 14 to 16 are explanatory diagrams for explaining examples of the print designation signal SI0 and the designation signal SI generated in the designation signal generation process. In FIGS. 14 to 16, a case in which the value M is "6", that is, a case in which the head unit 3 includes ejection sections D[1] to D[6] are assumed as an example. In addition, in FIGS. 14 to 16, a case in which the value K is "6", that is, a case in which the ejection section drive process including the printing process and the determination target drive process is executed in unit periods TP(1) to TP(6) are assumed as an example.

First, in step S103, as illustrated in FIG. 14, the ejection control section 22 generates the print designation signal SI0[TP(k)] including the individual print designation signals Sd0[1] to Sd0[M][TP(k)] for each unit period TP(k). In this case, a mark Ap1 is a mark indicating that the individual print designation signal Sd0[m][TP(k)] designates the large dot formation ejection section DP-1. In addition, a mark Ap2 is a mark indicating that the individual print designation signal Sd0[m][TP(k)] designates the small dot formation ejection section DP-2. When the mark Ap1 and the mark Ap2 are not attached to the individual print designation signal Sd0[m][TP(k)], it is indicated that the individual print designation signal Sd0[m][TP(k)] designates the non-drive ejection section DP-3.

Next, in step S111, as illustrated in FIG. 15, the ejection control section 22 selects, as the determination candidate ejection section DK, the ejection section D[m][TP(k)] corresponding to the individual print designation signal Sd0 [TP(k)] to which the mark Ap1 and the mark Ap2 are attached. In this case, a mark AK is a mark indicating that the individual print designation signal Sd0[m][TP(k)] corresponds to the ejection section D[m][TP(k)] selected as the determination candidate ejection section DK.

Thereafter, in steps S113 and S115, as illustrated in FIG. 16, the ejection control section 22 generates the designation signal SI[TP(k)] including the individual designation signals Sd[1] [TP(k)] to Sd[M] [TP(k)] by selecting one determination target ejection section DH from among one or more determination candidate ejection sections DK in each unit period TP(k) and updating the print designation signal SI0 based on the selection result. In this case, a mark AH is a mark indicating that the ejection section D[m][TP(k)] corresponding to the individual designation signal Sd[m][TP(k)] is selected as the determination target ejection section DH.

In FIG. 16, the individual designation signal Sd[m][TP(k)] to which the mark AH and the mark Ap1 are attached designates the determination target ejection section DH-1 to the ejection section D[m][TP(k)]. In addition, the individual designation signal Sd[m][TP(k)] to which the mark AH and the mark Ap2 are attached designates the determination target ejection section DH-2 to the ejection section D[m][TP(k)]. In addition, the individual designation signal Sd[m][TP(k)] to which the mark AK and the mark Ap1 are attached designates the large dot formation ejection section DP-1 to the ejection section D[m][TP(k)]. In addition, the individual designation signal Sd[m][TP(k)] to which the mark AK and the mark Ap2 are attached designates the small dot formation ejection section DP-2 to the ejection section D[m][TP(k)]. In addition, the individual designation signal Sd[m][TP(k)] to which the mark AH, the mark AK, the mark Ap1, and the mark Ap2 are not attached designates the non-drive ejection section DP-3 to the ejection section D[m][TP(k)].

When among the unit periods TP(1) to TP(K), there are a unit period TP(k1) in which the ejection state determination process can be performed on the ejection section D[m] using the determination mode in which the past correspondence determination mode BT is set as the large dot determination mode BT1 or the small dot determination mode BT2, and a unit period T(k2) in which the ejection state determination process can be performed on the ejection section D[m] using the determination mode in which the past correspondence determination mode BT is set as the non-drive determination mode BT3, the ejection control section 22 selects the determination target ejection section DH from among one or more determination candidate ejection sections DK such that the ejection state determination process in the unit period TP(k2) is prioritized over the ejection state determination process in the unit period TP(k1). Here, the variable k1 is a natural number that satisfies "$1 \leq k1 \leq K$", and the variable k2 is a natural number that satisfies "$1 \leq k2 \leq K$" and "$k2 \neq k1$".

In addition, when among the unit periods TP(1) to TP(K), there are a unit period TP(k1) in which the ejection state determination process can be performed on the ejection section D[m] using the determination mode in which the adjacent correspondence determination mode BR is set as a mode other than the non-drive determination mode BR6, and a unit period T(k2) in which the ejection state determination process can be performed on the ejection section D[m] using the determination mode in which the adjacent correspondence determination mode BR is set as the non-drive determination mode BR6, the ejection control section 22 selects the determination target ejection section DH from among one or more determination candidate ejection sections DK such that the ejection state determination process in the unit period TP(k2) is prioritized over the ejection state determination process in the unit period TP(k1).

5. Conclusion of Embodiment

As described above, the ink jet printer 1 according to the present embodiment includes: the ejection section D[m] including a piezoelectric element PZ[m] that is driven by the drive signal Com in the unit period TP(k) defined by the latch signal LAT, the cavity CV[m] that is filled with the ink and has a volume changed according to driving of the piezoelectric element PZ[m], and the nozzle N[m] that ejects the ink in the cavity CV[m] according to the change in volume of the cavity CV[m]; the detection circuit 33 that detects a potential of the piezoelectric element PZ[m]; and the determination unit 8 that determines the ink ejection state of the ejection section D[m] based on the detection result of the detection circuit 33 using a determination mode selected from among a plurality of determination modes, in which the determination unit 8 determines the ink ejection state of the ejection section D[m] using a determination mode B[m][TP(k)] including the large dot determination mode BT1 as the past correspondence determination mode BT or a determination mode B[m][TP(k)] including the small dot determination mode BT2 as the past correspondence determination mode BT, based on the detection signal SK[m] indicating the detection result of the detection circuit 33 in the unit period TP(k), when the piezoelectric element PZ[m] is driven by the drive signal Com in the unit period TP(k−1) preceding the unit period TP(k), and determines the ink ejection state of the ejection section D[m] using a determination mode B[m][TP(k)] including the non-drive determination mode BT3 as the past correspondence determination mode BT based on the detection signal SK[m] indicating the detection result of the detection circuit 33 in the unit period TP(k), when the piezoelectric element PZ[m] is not driven by the drive signal Com in the unit period TP(k−1) preceding the unit period TP(k).

As described above, according to the present embodiment, the ejection state determination process is executed using the determination mode selected based on the presence/absence of driving of the ejection section D[m] in the unit period TP(k−1). Therefore, according to the present embodiment, it is possible to execute the ejection state determination process for the ejection section D[m] in the unit period TP(k) in consideration of the influence of the driving of the ejection section D[m] in the unit period TP(k−1) on the ejection section D[m] in the unit period TP(k). That is, according to the present embodiment, it is possible to accurately determine the ink ejection state of the ejection section D[m] in the ejection state determination process as compared to an aspect of executing the ejection state determination process for the ejection section D[m] in the unit period TP(k) without considering the driving of the ejection section D[m] in the unit period TP(k−1).

In the present embodiment, the unit period TP(k) is an example of a "one unit period", and the unit period TP(k−1) is an example of "another unit period". In addition, in the following, the determination mode B[m][TP(k)] including the large dot determination mode BT1 and the determination mode B[m][TP(k)] including the small dot determination mode BT2 may be collectively referred to as a past drive determination mode T-K, and the determination mode B[m][TP(k)] including the non-drive determination mode BT3 may be collectively referred to as a past non-drive determination mode BT-H. In this case, the past drive determination mode BT-K is an example of a "first determination mode", and the past non-drive determination mode BT-H is an example of a "second determination mode".

Further, in the present embodiment, the determination unit 8 determines the ink ejection state of the ejection section D[m] using the determination mode B[m][TP(k)] based on the detection signal SK[m] indicating the detection result of the detection circuit 33 in the unit period TP(k), by selecting the determination mode B[m][TP(k)] from among the plurality of determination modes based on the individual designation signal Sd[m][TP(k)] that designates the presence/absence of the driving of the piezoelectric element PZ[m] in the unit period TP(k) by the drive signal Com.

Therefore, according to the present embodiment, it is possible to accurately determine the ink ejection state of the ejection section D[m] in the ejection state determination process as compared to an aspect of executing the ejection state determination process for the ejection section D[m] in the unit period TP(k) without considering the driving of the ejection section D[m] in the unit period TP(k).

In the present embodiment, the individual designation signal Sd[m][TP(k)] is an example of "one designation signal".

Further, in the present embodiment, the determination unit 8 determines the ink ejection state of the ejection section D[m] using the determination mode B[m][TP(k)] based on the detection signal SK[m] indicating the detection result of the detection circuit 33 in the unit period TP(k−1), by selecting the determination mode B[m][TP(k)] from among the plurality of determination modes based on the individual designation signal Sd[m][TP(k)] that designates the presence/absence of the driving of the piezoelectric element PZ[m] in the unit period TP(k−1) by the drive signal Com.

Therefore, according to the present embodiment, it is possible to accurately determine the ink ejection state of the ejection section D[m] in the ejection state determination process as compared to an aspect of executing the ejection state determination process for the ejection section D[m] in the unit period TP(k) without considering the driving of the ejection section D[m] in the unit period TP(k−1).

In the present embodiment, the individual designation signal Sd[m][TP(k−1)] is an example of "another designation signal".

In addition, the present embodiment may include the ejection control section 22 that controls the ejection section D[m] using the designation signal SI that designates the presence/absence of the driving of the piezoelectric element PZ[m] in the unit period TP by the drive signal Com, in which when in K unit periods TP(1) to TP(K) defined by the latch signal LAT, there are a unit period TP(k1) in which the ejection state determination process for the ejection section D[m] can be performed using the past drive determination mode BT-K, and a unit period TP(k2) in which the ejection state determination process for the ejection section D[m] can be performed using the past non-drive determination mode BT-H, the ejection control section 22 may give priority to the ejection state determination process in the unit period TP(k2) over the ejection state determination process in the unit period TP(k1).

Therefore, according to the present embodiment, when the ejection state determination process for the ejection section D[m] is executed in the unit period TP(k), it is possible to reduce the possibility that the driving of the ejection section D(m) in the unit period TP(k−1) is affected by the ejection state determination process.

In the present embodiment, the unit period TP(k1) is an example of a "first unit period", and the unit period TP(k2) is an example of "second unit period".

In the following, four determination thresholds of the threshold VM-L(α, β, γ), the threshold VM-H(α, β, γ), the threshold TF-L(α, β, γ), and the threshold TF-H(α, β, γ), which are used in the ejection state determination process using the past drive determination mode BT-K, are collectively referred to as a past driving threshold VM-L11, a past driving threshold VM-H11, a past driving threshold TF-L11, and a past driving threshold TF-H11, respectively. In addition, in the following, four determination thresholds of the threshold VM-L(α, β, γ), the threshold VM-H(α, β, γ), the threshold TF-L(α, β, γ), and the threshold TF-H(α, β, γ), which are used in the ejection state determination process using the past non-drive determination mode BT-H, are collectively referred to as a past non-driving threshold VM-L12, a past non-driving threshold VM-H12, a past non-driving threshold TF-L12, and a past non-driving threshold TF-H12, respectively.

In this case, in the present embodiment, when the ejection state determination process for the ejection section D[m] is performed using the past drive determination mode BT-K, the determination unit 8 compares the amplitude VM[m], which has the detection signal SK[m] indicating the detection result of the detection circuit 33 in the unit period TP(k), with the past driving threshold VM-L11 and the past driving threshold VM-H11, and compares the initial time TF[m], which has the detection result of the detection circuit 33 in the unit period TP(k) with the past driving threshold TF-L11 and the past driving threshold TF-H11, to determine the ink ejection state of the ejection section D[m] based on the two comparison results. In addition, in the present embodiment, when the ejection state determination process for the ejection section D[m] is performed using the past non-drive determination mode BT-H, the determination unit 8 compares the amplitude VM[m], which has the detection signal SK[m] indicating the detection result of the detection circuit 33 in the unit period TP(k), with a past non-driving threshold VM-L12 and the past non-driving threshold VM-H12, and compares the initial time TF[m], which has the detection signal SK[m] indicating the detection result of the detection circuit 33 in the unit period TP(k) with the past non-driving threshold TF-L12 and the past non-driving threshold TF-H12, to determine the ink ejection state of the ejection section D[m] based on the two comparison results. In this case, the past driving threshold VM-L11 is different from the past non-driving threshold VM-L12, the past driving threshold VM-H11 is different from the past non-driving threshold VM-H12, the past driving threshold TF-L11 is different from the past non-driving threshold TF-L12, or the past driving threshold TF-H11 is different from the past non-driving threshold TF-H12.

Therefore, according to the present embodiment, it is possible to accurately determine the ink ejection state of the ejection section D[m] in the ejection state determination process as compared to an aspect using the same determination threshold regardless of the presence/absence of the driving of the ejection section D[m] in the unit period TP(k−1).

In the present embodiment, each of the past driving threshold VM-L11, the past driving threshold VM-H11, the past driving threshold TF-L11, and the past driving threshold TF-H11 is an example of a "first determination reference value", and each of the past non-driving threshold VM-L12, the past non-driving threshold VM-H12, the past non-driving threshold TF-L12, and the past non-driving threshold TF-H12 is an example of a "second determination reference value".

In the following, the determination mode B[m][TP(k)] including the large dot determination mode BR1, the determination mode B[m][TP(k)] including the large dot determination mode BR2, the determination mode B[m][TP(k)] including the large dot determination mode BR3, the determination mode B[m][TP(k)] including the small dot determination mode BR4, and the determination mode B[m][TP(k)] including the small dot determination mode BR5 may be collectively referred to as an adjacent drive determination mode BR-K, and the determination mode B[m][TP(k)] including the non-drive determination mode BR6 may be collectively referred to as an adjacent non-drive determination mode BR-H. Here, the adjacent drive determination mode BR-K is another example of the "first determination mode", and the adjacent non-drive determination mode BR-H is another example of the "second determination mode".

In this case, the ink jet printer 1 according to the present embodiment includes: M ejection sections D[1] to D[M] including an ejection section D[m] the includes the piezoelectric element PZ[m] driven by the drive signal Com, the cavity CV[m] having a volume changed according to the driving of the piezoelectric element PZ[m] filled with the ink, and the nozzle N[m] that ejects the ink into the cavity CV[m] according to the change in volume of the cavity CV[m], and an ejection section D[m+1] the includes the piezoelectric element PZ[m+1] driven by the drive signal Com, the cavity CV[m+1] having a volume changed according to the driving of the piezoelectric element PZ[m+1] filled with the ink, and the nozzle N[m+1] that ejects the ink into the cavity CV[m+1] according to the change in volume of the cavity CV[m]; the reservoir 325 that supplies the ink to the M ejection sections D[1] to D[M]; the detection circuit 33 that detects a potential of the piezoelectric element PZ[m]; and the determination unit 8 that determines the ink ejection state of the ejection section D[m] based on the detection result of the detection circuit 33 using a determination mode selected from a plurality of determination modes, in which the determination unit 8 determines the ink ejection state of the ejection section D[m] using the adjacent drive determination mode BR-K according to the detection signal SK[m] indicating the detection result of the detection circuit 33, when the ejection section D[m+1] is driven by the drive signal Com, and determines the ink ejection state of the ejection section D[m] using the adjacent non-drive determination mode BR-H according to the detection signal SK[m] indicating the detection result of the detection circuit 33, when the ejection section D[m+1] is not driven by the drive signal Com.

As described above, according to the present embodiment, it is possible to execute the ejection state determination process for the ejection section D[m] in consideration of the influence of the driving of the ejection section D[m+1]. That is, according to the present embodiment, it is possible to accurately determine the ink ejection state of the ejection section D[m] in the ejection state determination process as compared to an aspect of executing the ejection state determination process for the ejection section D[m] without considering the driving of the ejection section D[m+1].

In the present embodiment, the ejection section D[m] is an example of a "first ejection section, the ejection section D[m+1] is an example of a "second ejection section, the piezoelectric element PZ[m] is an example of a "first piezoelectric element", the piezoelectric element PZ[m+1] is an example of a "second piezoelectric element", the cavity CV[m] is an example of a "first pressure chamber", the cavity CV[m+1] is an example of a "second pressure chamber", the nozzle N[m] is an example of a "first nozzle", and the nozzle N[m+1] is an example of a "second nozzle".

Further, in the present embodiment, the cavity CV[m] provided in the ejection section D[m] and the cavity CV[m+1] provided in the ejection section D[m+1] may be adjacent to each other via the partition wall WL[m][m+1].

In this case, the vibration generated in the ejection section D[m+1] accompanying the driving of the ejection section D[m+1] is transmitted to the ejection section D[m] via the partition wall WL[m][m+1]. On the other hand, in the present embodiment, the ejection state determination process for the ejection section D[m] is executed in consideration of the driving of the ejection section D[m+1]. Therefore, according to the present embodiment, it is possible to accurately determine the ink ejection state of the ejection section D[m] in the ejection state determination process as compared to an aspect of executing the ejection state determination process for the ejection section D[m] without considering the driving of the ejection section D[m+1].

Further, in the present embodiment, the determination unit 8 selects the determination mode using the ejection state determination process for the ejection section D[m] from among the plurality of determination modes based on the individual designation signal Sd[m] that designates the presence/absence of the driving of the piezoelectric element PZ[m] by the drive signal Com.

Therefore, according to the present embodiment, it is possible to execute the ejection state determination process for the ejection section D[m] in consideration of the influence of the driving of the ejection section D[m] on the ejection state determination process for the ejection section D[m]. That is, according to the present embodiment, it is possible to accurately determine the ink ejection state of the ejection section D[m] in the ejection state determination process as compared to an aspect of executing the ejection state determination process for the ejection section D[m] without considering the influence of the driving of the ejection section D[m] on the ejection state determination process for the ejection section D[m].

In the present embodiment, the individual designation signal Sd[m] is an example of a "first designation signal".

Further, in the present embodiment, the determination unit 8 selects the determination mode using the ejection state determination process for the ejection section D[m] from among the plurality of determination modes based on the individual designation signal Sd[m+1] that designates the presence/absence of the driving of the piezoelectric element PZ[m+1] by the drive signal Com.

Therefore, according to the present embodiment, it is possible to execute the ejection state determination process for the ejection section D[m] in consideration of the influence of the driving of the ejection section D[m+1] on the ejection state determination process for the ejection section D[m]. That is, according to the present embodiment, it is possible to accurately determine the ink ejection state of the ejection section D[m] in the ejection state determination process as compared to an aspect of executing the ejection state determination process for the ejection section D[m] without considering the influence of the driving of the ejection section D[m+1] on the ejection state determination process for the ejection section D[m].

In the present embodiment, the individual designation signal Sd[m+1] is an example of a "second designation signal".

Further, the present embodiment may include the ejection control section 22 that controls the M ejection sections D[1] to D[M] using the designation signal SI[TP(k)] that designates the presence/absence of the driving of each of the M ejection sections D[1] to D[M] by the drive signal Com in K unit periods TP(1) to TP(K) defined by the latch signal LAT, in which when in the K unit periods TP(1) to TP(K), there are a unit period TP(k1) in which the ejection state determination process for the ejection section D[m] can be performed using the adjacent drive determination mode BR-K and a unit period TP(k2) in which the ejection state determination process for the ejection section D[m] can be performed using the adjacent non-drive determination mode BR-H, the ejection control section 22 may give priority to the ejection state determination process in the unit period TP(k2) over the ejection state determination process in the unit period TP(k1).

Therefore, according to the present embodiment, when the ejection state determination process for the ejection section D[m] is executed, it is possible to reduce the possibility that the ejection state determination process is affected by the driving of the ejection section D[m+1].

In the following, four determination thresholds of the threshold VM-L(α, β, γ), the threshold VM-H(α, β, γ), the threshold TF-L(α, β, γ), and the threshold TF-H(α, β, γ), which are used in the ejection state determination process using the adjacent drive determination mode BR-K, are collectively referred to as an adjacent driving threshold VM-L21, an adjacent driving threshold VM-H21, an adjacent driving threshold TF-L21, and an adjacent driving threshold TF-H21, respectively. In addition, four determination thresholds of the threshold VM-L(α, β, γ), the threshold VM-H(α, β, γ), the threshold TF-L(α, β, γ), and the threshold TF-H(α, β, γ), which are used in the ejection state determination process using the adjacent non-drive determination mode BR-H, are collectively referred to as an adjacent non-driving threshold VM-L22, an adjacent non-driving threshold VM-H22, an adjacent non-driving threshold TF-L22, and an adjacent non-driving threshold TF-H22, respectively.

In this case, in the present embodiment, when the ejection state determination process for the ejection section D[m] is performed using the adjacent drive determination mode BR-K, the determination unit 8 compares the amplitude VM[m], which has the detection signal SK[m] indicating the detection result of the detection circuit 33 in the unit period TP(k), with the adjacent driving threshold VM-L21 and the adjacent driving threshold VM-H21, and compares the initial time TF[m], which has the detection signal SK[m] indicating the detection result of the detection circuit 33 in the unit period TP(k) with the adjacent driving threshold TF-L21 and the adjacent driving threshold TF-H21, to determine the ink ejection state of the ejection section D[m] based on the two comparison results. In addition, in the present embodiment, when the ejection state determination process for the ejection section D[m] is performed using the adjacent non-drive determination mode BR-H, the determination unit 8 compares the amplitude VM[m], which has the detection signal SK[m] indicating the detection result of the detection circuit 33 in the unit period TP(k), with the adjacent non-driving threshold VM-L22 and the adjacent non-driving threshold VM-H22, and compares the initial time TF[m], which has the detection signal SK[m] indicating the detection result of the detection circuit 33 in the unit period TP(k) with the adjacent non-driving threshold TF-L22 and the adjacent non-driving threshold TF-H22, to determine the ink ejection state of the ejection section D[m] based on the two comparison results. In this case, the adjacent driving threshold VM-L21 is different from the adjacent non-driving threshold VM-L22, the adjacent driving threshold VM-H21 is different from the adjacent non-driving threshold VM-H22, the adjacent driving threshold TF-L21 is different from the adjacent non-driving threshold TF-L22, or the adjacent driving threshold TF-H21 is different from the adjacent non-driving threshold TF-H22.

Therefore, according to the present embodiment, it is possible to accurately determine the ink ejection state of the ejection section D[m] in the ejection state determination process as compared to an aspect using the same determination threshold regardless of the presence/absence of the driving of the ejection section D[m+1].

In the present embodiment, each of the adjacent driving threshold VM-L21, the adjacent driving threshold VM-H21, the adjacent driving threshold TF-L21, and the adjacent driving threshold TF-H21 is an example of a "first determination reference value", and each of the adjacent non-driving threshold VM-L22, the adjacent non-driving threshold VM-H22, the adjacent non-driving threshold TF-L22, and the adjacent non-driving threshold TF-H22 is an example of a "second determination reference value".

B. Modification Example

Each of the above examples can be modified in various ways. A specific aspect of modification is illustrated below. Two or more aspects selected in any manner from the following examples can be appropriately combined with each other within a range not inconsistent with each other. In addition, in the modification examples illustrated below, elements having the same effects and functions as those of the embodiment will be given the reference numerals used in the description above, and the detailed description thereof will be appropriately omitted. Modification Example 1

In the above-described embodiment, an aspect, in which the ejection control section 22 generates K designation signals SI[TP(k)] to SI[TP(k)] corresponding to the K unit periods TP(1) to TP(K) after generating K print designation signals SI0[TP(1)] to SI0[TP(K)] corresponding to the K unit periods TP(1) to TP(K) in which the ejection section drive process is executed, has been described by way of example, but the present disclosure is not limited to such an aspect. For example, the ejection control section 22 may generate the designation signal SI[TP(k)] every time the print designation signal SI0[TP(k)] corresponding to the unit period TP(k) is generated.

Figure 17:
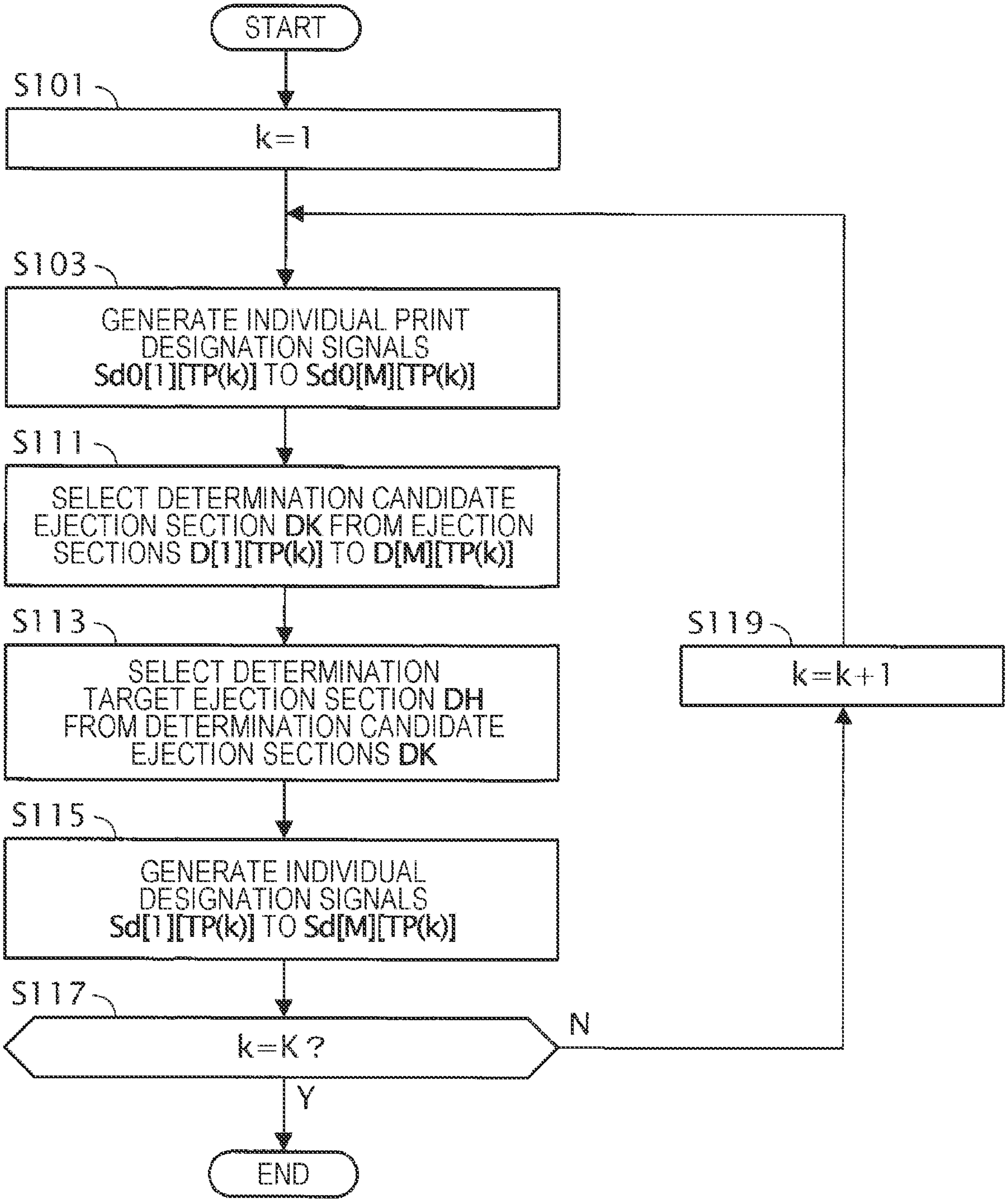
FIG. 17 is a flowchart for explaining an example of a designation signal generation process according to Modification Example 1.

FIG. 17 is a flowchart illustrating an example of an operation of the control unit 2 when the designation signal generation process is executed according to the present modification example.

As illustrated in FIG. 17, in the designation signal generation process according to the present modification example, first, the ejection control section 22 sets the variable k to "1" (S101).

Next, the ejection control section 22 generates a print designation signal SI0[TP(k)] including individual print designation signals Sd0[1][TP(k)] to Sd0[M] [TP(k)] based on the print data Img (S103).

Next, the ejection control section 22 selects one or more determination candidate ejection sections DK from among the ejection sections D[1][TP(k)] to D[M][TP(k)](Sill).

Next, the ejection control section 22 selects one determination target ejection section DH from the one or more determination candidate ejection sections DK selected in step S111 (S113).

Next, the ejection control section 22 generates the designation signal SI[TP(k)] including the individual designation signals Sd[1][TP(k)] to Sd[M][TP(k)] based on the selection result of the determination target ejection section DH in step S113, by updating the print designation signal SI0[TP(k)] generated in step S103 (S115).

Next, the ejection control section 22 determines whether or not the value k satisfies "k=K" (S117).

Then, when the result of determination in step S117 is negative, the ejection control section 22 adds "1" to the value k (S119), and the process proceeds to step S111. On the other hand, when the result of the determination in step S117 is positive, the ejection control section 22 ends the designation signal generation process illustrated in FIG. 17.

In the present modification example, in step S113, the ejection control section 22 may select the determination target ejection section DH based on a part or all of the K designation signals SI[TP(1)] to SI[TP(k)] corresponding to the unit periods TP(1) to TP(k). In this case, when the ejection state determination process for the ejection section D[m] is executed in the unit period TP(k), it is possible to reduce the possibility that the driving of the ejection section D(m) in the unit period TP(k−1) is affected by the ejection state determination process. In addition, when the ejection state determination process for the ejection section D[m] is executed, it is possible to reduce the possibility that the ejection state determination process is affected by the driving of the ejection section D[m+1].

Modification Example 2

In the above described embodiment and Modification Example 1, when the ejection state determination process for the ejection section D[m] is performed, the determination unit 8 selects the adjacent correspondence determination mode BR based on an aspect of driving of the ejection section D[m+1] and the ejection section D[m−1] adjacent to the ejection section D[m], but the present disclosure is not limited to such an aspect.

For example, when the ejection state determination process for the ejection section D[m] is performed, the determination unit 8 may select the adjacent correspondence determination mode BR based on an aspect of driving of an ejection section D[m+2] adjacent to the ejection section D[m+1] and an aspect of driving of the ejection section D[m−2] adjacent to the ejection section D[m−1], in addition to the aspect of driving of the ejection section D[m+1] and the ejection section D[m−1] adjacent to the ejection section D[m].

In addition, for example, when the ejection state determination process for the ejection section D[m] is performed, the determination unit 8 may select the adjacent correspondence determination mode BR based on an aspect of driving of the ejection section D different from the ejection section D[m].

That is, in the present modification example, when the ejection state determination process for the ejection section D[m] is performed, the determination unit 8 may select the determination mode B[m][TP(k)] based on the aspect and presence/absence of driving of the plurality of ejection sections D located in a predetermined range including the ejection section D[m].

According to the present modification example, when the vibration generated in a specific ejection section D is transmitted to the ejection section D[m] via the reservoir 325 according to the driving of the specific ejection section D different from the ejection section D[m], the ejection state determination process for the ejection section D[m] can be executed in consideration of the vibration transmitted from the specific ejection section D to the ejection section D[m]. Therefore, according to the present embodiment, it is possible to accurately determine the ink ejection state of the ejection section D[m] in the ejection state determination process as compared to an aspect of executing the ejection state determination process for the ejection section D[m] without considering the driving of the specific ejection section D.

Modification Example 3

In the above-described embodiment and Modification Examples 1 and 2, the determination unit 8 executes the ejection state determination process for the ejection section D[m] based on the amplitude VM[m] and the initial time TF[m] having the detection signal SK[m], but the present disclosure is not limited to such an aspect.

For example, the determination unit 8 may perform the ejection state determination process for the ejection section D[m] based on the amplitude VM[m] and the initial time TF[m] having the detection signal SK[m]. Specifically, in the ejection state determination process for the ejection section D[m][TP(k)], the determination unit 8 may generate determination information SH[m] indicating that the ejection state of the ejection section D[m] is normal, when the amplitude determination condition is satisfied that the amplitude VM[m] is greater than or equal to the threshold VM-L(α, β, γ) and less than or equal to the threshold VM-H(α, β, γ). In addition, in the ejection state determination process for the ejection section D[m][TP(k)], the determination unit 8 may generate determination information SH[m] indicating that the ejection state of the ejection section D[m] is normal, when the phase determination condition is satisfied that the initial time TF[m] is greater than or equal to the threshold TF-L(α, β, γ) and less than or equal to the threshold TF-H(α, β, γ).

Modification Example 4

In the above-described embodiment and Modification Examples 1 to 3, an aspect, in which the determination mode when the determination unit 8 executes the ejection state determination process with the current correspondence determination mode BG and the past correspondence determination mode BT with the adjacent correspondence determination mode BR, has been described by way of example, but the present disclosure is not limited to such an aspect. The determination mode when the determination unit 8 executes the ejection state determination process may include at least one of the past correspondence determination mode BT and the adjacent correspondence determination mode BR. Specifically, the determination unit 8 may execute the ejection state determination process using one past correspondence determination mode BT selected from among a plurality of past correspondence determination modes BT. In addition, the determination unit 8 may execute the ejection state determination process using one adjacent correspondence determination mode BR selected from among a plurality of adjacent correspondence determination modes BR.

Modification Example 5

In the above-described embodiment and Modification Examples 1 to 4, the head unit 3 includes the supply circuit 31, the recording head 32, and the detection circuit 33, but the present disclosure is not limited to such an aspect. The head unit 3 may include components other than the supply circuit 31, the recording head 32, and the detection circuit 33. For example, the head unit 3 may include the determination unit 8 in addition to the supply circuit 31, the recording head 32, and the detection circuit 33.

Figure 18:
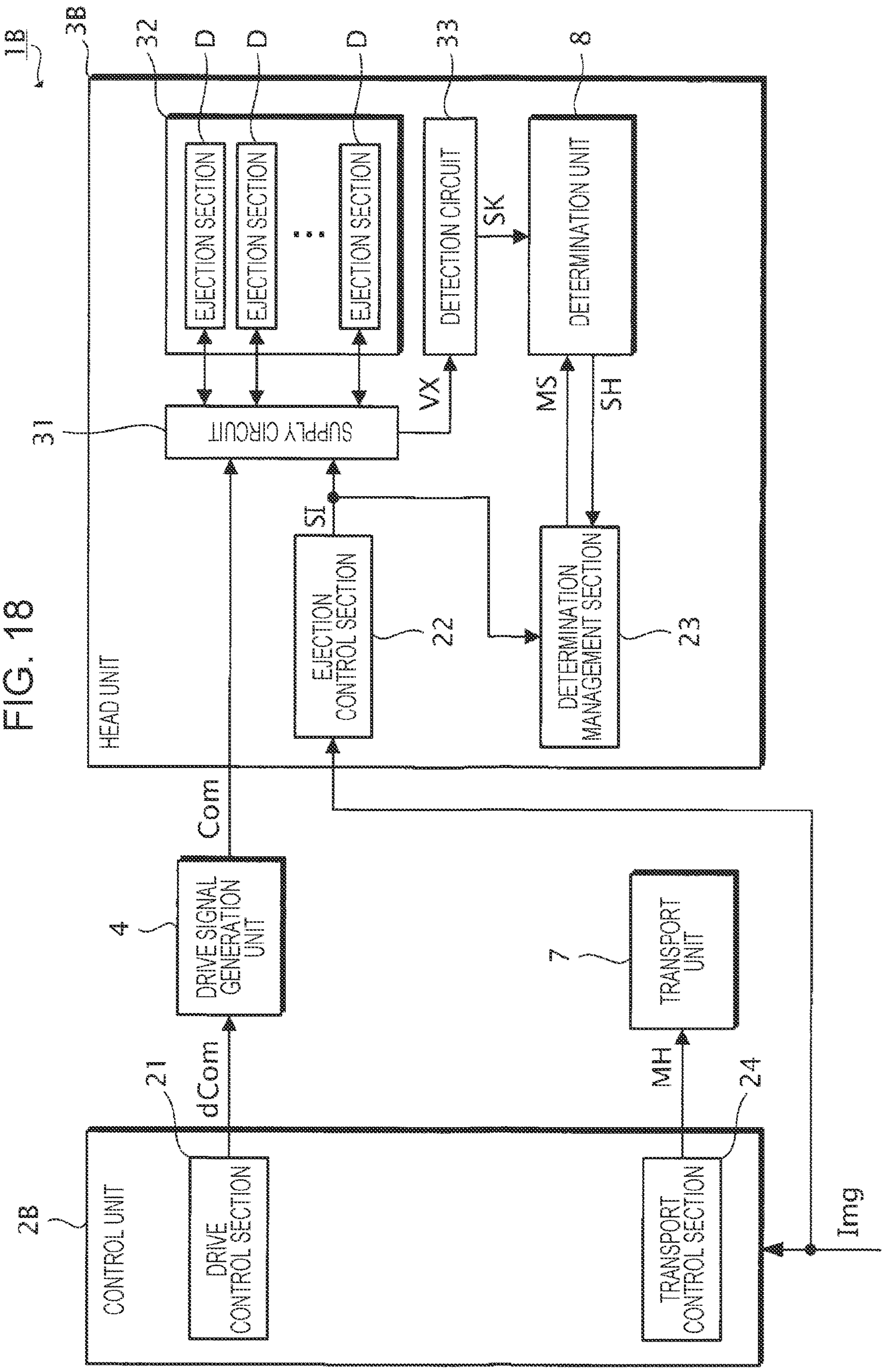
FIG. 18 is a block diagram illustrating an example of a configuration of an ink jet printer according to Modification Example 5.

FIG. 18 is a functional block diagram illustrating an example of a configuration of an ink jet printer 1B according to the present modification example.

As illustrated in FIG. 18, an ink jet printer 1B includes a control unit 2B, a head unit 3B, a drive signal generation unit 4, and a transport unit 7.

The control unit 2B is different from the control unit 2 in that the ejection control section 22 and the determination management section 23 are not provided.

The head unit 3B is different from the head unit 3 in that the ejection control section 22, the determination management section 23, and the determination unit 8 are provided.

According to the present modification example, since the head unit 3B includes the ejection control section 22, the determination management section 23, and the determination unit 8, when a new ink jet printer is developed, the head unit 3B is applied to the ink jet printer, so that, it is possible to easily perform the ejection state determination process.

Modification Example 6

Although it is assumed that when the ink jet printer 1 includes four head units 3 in the above-described embodiment and Modification Examples 1 to 5, the present disclosure is not limited to such an aspect. The ink jet printer 1 may include one or more and three or less head units 3, or the ink jet printer 1 may include five or more head units 3.

Modification Example 7

In the above-described embodiments and Modification Examples 1 to 6, the ink jet printer 1 is illustrated as a serial printer, but the present disclosure is not limited to such a mode. The ink jet printer 1 may be a so-called line printer in which a plurality of nozzles N are provided in the head unit 3 to extend wider than the width of the recording paper PP.

What is claimed is:

1. A liquid ejecting apparatus comprising:
an ejection section including
a piezoelectric element that is driven by a drive signal in a unit period defined by a timing signal,
a pressure chamber filled with a liquid and having a volume changed according to driving of the piezoelectric element, and
a nozzle ejecting the liquid in the pressure chamber according to the change in volume of the pressure chamber;
a detection section detecting a potential of the piezoelectric element; and
a determination section determining an ejection state of the ejection section according to a detection result of the detection section using a determination mode selected from among a plurality of determination modes including a first determination mode and a second determination mode, wherein
when the piezoelectric element is driven by the drive signal in another unit period preceding one unit period,
the determination section determines the ejection state of the ejection section using the first determination mode according to a detection result of the detection section in the one unit period, and
when the piezoelectric element is not driven by the drive signal in the another unit period,
the determination section determines the ejection state of the ejection section using the second determination mode according to the detection result of the detection section in the one unit period.

2. The liquid ejecting apparatus according to claim 1, wherein
based on one designation signal that designates presence/absence of driving of the piezoelectric element by the drive signal in the one unit period,
the determination section
selects one determination mode from among the plurality of determination modes, and
determines the ejection state of the ejection section using the one determination mode according to the detection result of the detection section in the one unit period.

3. The liquid ejecting apparatus according to claim 1, wherein
based on another designation signal that designates presence/absence of driving of the piezoelectric element by the drive signal in the another unit period,
the determination section
selects one determination mode from among the plurality of determination modes, and
determines the ejection state of the ejection section using the one determination mode according to the detection result of the detection section in the one unit period.

4. The liquid ejecting apparatus according to claim 1, further comprising:
an ejection control section controlling the ejection section by a designation signal that designates the presence/absence of driving of the piezoelectric element by the drive signal in the unit period, wherein
when, in a plurality of the unit periods defined by the timing signal, there are a first unit period in which determination of the ejection state of the ejection section is performed using the first determination mode, and a second unit period in which determination of the ejection state of the ejection section is performed using the second determination mode,
the ejection control section prioritizes the determination using the second determination mode over the determination using the first determination mode.

5. The liquid ejecting apparatus according to claim 1, wherein
the determination section
compares a feature amount having a detection signal, which indicates a detection result of the detection section in the one unit period, with a first determination reference value to determine the ejection state of the ejection section based on a comparison result, in the first determination mode, and
compares the feature amount having the detection signal, which indicates the detection result of the detection section in the one unit period, with a second determination reference value different from the first determination reference value to determine the ejection state of the ejection section based on a comparison result, in the second determination mode.

6. A print head comprising:
an ejection section including
a piezoelectric element that is driven by a drive signal in a unit period defined by a timing signal,
a pressure chamber filled with a liquid and having a volume changed according to driving of the piezoelectric element, and
a nozzle ejecting the liquid in the pressure chamber according to the change in volume of the pressure chamber;
a detection section detecting a potential of the piezoelectric element; and a determination section determining an ejection state of the ejection section according to a detection result of the detection section using a determination mode selected from among a plurality of determination modes including a first determination mode and a second determination mode, wherein when the piezoelectric element is driven by the drive signal in another unit period preceding one unit period, the determination section determines the ejection state of the ejection section using the first determination mode according to a detection result of the detection section in the one unit period, and when the piezoelectric element is not driven by the drive signal in the another unit period, the determination section determines the ejection state of the ejection section using the second determination mode according to the detection result of the detection section in the one unit period.

7. The print head according to claim 6, wherein based on one designation signal that designates presence/absence of driving of the piezoelectric element by the drive signal in the one unit period, the determination section selects one determination mode from among the plurality of determination modes, and determines the ejection state of the ejection section using the one determination mode according to the detection result of the detection section in the one unit period.

8. The print head according to claim 6, wherein based on another designation signal that designates presence/absence of driving of the piezoelectric element by the drive signal in the another unit period, the determination section selects one determination mode from among the plurality of determination modes, and determines the ejection state of the ejection section using the one determination mode according to the detection result of the detection section in the one unit period.

9. The print head according to claim 6, further comprising:

an ejection control section controlling the ejection section by a designation signal that designates the presence/absence of driving of the piezoelectric element by the drive signal in the unit period, wherein when, in a plurality of the unit periods defined by the timing signal, there are a first unit period in which determination of the ejection state of the ejection section is performed using the first determination mode, and a second unit period in which determination of the ejection state of the ejection section is performed using the second determination mode, the ejection control section prioritizes the determination using the second determination mode over the determination using the first determination mode.

10. The print head according to claim 6, wherein the determination section compares a feature amount having a detection signal, which indicates a detection result of the detection section in the one unit period, with a first determination reference value to determine the ejection state of the ejection section based on a comparison result, in the first determination mode, and compares the feature amount of the detection signal indicating a detection result of the detection section in the one unit period with a second determination reference value different from the first determination reference value to determine the ejection state of the ejection section based on a comparison result, in the second determination mode.

* * * * *